US012812700B2

(12) United States Patent

Zhang et al.

(10) Patent No.: US 12,812,700 B2
(45) Date of Patent: Nov. 24, 2026

(54) Wi-Fi AWARE LINK ESTABLISHMENT METHOD AND SYSTEM, ELECTRONIC DEVICE, AND STORAGE MEDIUM

(71) Applicant: Huawei Technologies Co., Ltd., Shenzhen (CN)

(72) Inventors: Shen Zhang, Nanjing (CN); Bo Ling, Shenzhen (CN); Li Li, Nanjing (CN); Zhongyin Jiang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 671 days.

(21) Appl. No.: 17/906,518

(22) PCT Filed: Mar. 11, 2021

(86) PCT No.: PCT/CN2021/080097

§ 371 (c)(1),
(2) Date: Sep. 16, 2022

(87) PCT Pub. No.: WO2021/185141

PCT Pub. Date: Sep. 23, 2021

(65) Prior Publication Data

US 2023/0129780 A1 Apr. 27, 2023

(30) Foreign Application Priority Data

Mar. 18, 2020 (CN) ......................... 202010191809.2

(51) Int. Cl.
*H04W 76/10* (2018.01)
*H04W 56/00* (2009.01)
*H04W 84/12* (2009.01)

(52) U.S. Cl.
CPC ....... *H04W 76/10* (2018.02); *H04W 56/0015* (2013.01); *H04W 84/12* (2013.01)

(58) Field of Classification Search
CPC .. H04W 76/10; H04W 56/0015; H04W 84/12
See application file for complete search history.

(56) References Cited

U.S. PATENT DOCUMENTS 9,949,063 B2 * 4/2018 Yong ........................ H04W 4/80
11,671,259 B2 * 6/2023 Liu ........................ H04L 63/061
713/155

(Continued)

FOREIGN PATENT DOCUMENTS

CN 106233700 A 12/2016
CN 106851775 A 6/2017

(Continued)

*Primary Examiner* — Sujoy K Kundu
*Assistant Examiner* — Andrew Chanul Kim
(74) *Attorney, Agent, or Firm* — Slater Matsil, LLP

(57) ABSTRACT

This application discloses a Wi-Fi Aware link establishment method and system, an electronic device, and a storage medium. The Wi-Fi Aware link establishment method includes: A primary device receives first connection information sent by a secondary device, where the first connection information includes a Wi-Fi Aware service name needed by the secondary device. The primary device sends second connection information to the secondary device based on the Wi-Fi Aware service name needed by the secondary device, where the second connection information includes confirmation information, the confirmation information is notification information indicating that the primary device confirms that there is the Wi-Fi Aware service name needed by the secondary device. The primary device obtains a Wi-Fi Aware data path request frame sent by the secondary device. The primary device completes link establishment with the secondary device based on the Wi-Fi Aware data path request frame.

18 Claims, 10 Drawing Sheets

(56) References Cited

U.S. PATENT DOCUMENTS

| | | | | |
|---|---|---|---|---|
| 2015/0319092 | A1 | 11/2015 | Ghai | |
| 2016/0021560 | A1 * | 1/2016 | Reshef | H04W 84/12 370/338 |
| 2016/0198494 | A1 * | 7/2016 | Huang | H04L 67/51 370/329 |
| 2016/0234301 | A1 | 8/2016 | Qi et al. | |
| 2016/0323925 | A1 | 11/2016 | Alanen et al. | |
| 2017/0353381 | A1 * | 12/2017 | Qi | H04W 40/24 |
| 2018/0054492 | A1 | 2/2018 | Kim et al. | |
| 2019/0098483 | A1 | 3/2019 | Qi et al. | |

FOREIGN PATENT DOCUMENTS

| | | | |
|---|---|---|---|
| CN | 108260188 | A | 7/2018 |
| CN | 111405681 | A | 7/2020 |
| WO | 2017113176 | A1 | 7/2017 |
| WO | 2018186919 | A1 | 10/2018 |

* cited by examiner

Wi-Fi AWARE LINK ESTABLISHMENT METHOD AND SYSTEM, ELECTRONIC DEVICE, AND STORAGE MEDIUM

CROSS-REFERENCE TO RELATED APPLICATIONS

This application is a national stage of International Application No. PCT/CN2021/080097, filed on Mar. 11, 2021, which claims priority to Chinese Patent Application No. 202010191809.2, filed on Mar. 18, 2020. Both of the aforementioned applications are hereby incorporated by reference in their entireties.

TECHNICAL FIELD

This application relates to the field of communications technologies, and in particular, to a Wi-Fi Aware link establishment method and system, an electronic device, and a storage medium.

BACKGROUND

Wi-Fi Aware (Wi-Fi Neighborhood Aware Network, Wi-Fi neighborhood aware network, also referred to as Wi-Fi Neighborhood Aware Network, NAN for short) is a new low-power-consumption peer-to-peer interconnected interworking Wi-Fi Mesh communications technology. The technology can bypass a network infrastructure (for example, an AP (Access Point, AP) or a cellular network), to implement one-to-one, one-to-many, or many-to-many connection and communication between devices.

During Wi-Fi Aware link establishment, the Wi-Fi Aware specifies that there is an active time window DW (Discovery Window) of 16 TUs at an interval of 512 TUs (Time Unit, time unit, 1 TU=1024 microseconds). Only during the active time window, Wi-Fi Aware devices can exchange data frames in a Wi-Fi Aware protocol, such as a Service Discovery Frame (service discovery frame), an NDP Request Frame (NAN data path request frame, or referred to as Wi-Fi Aware data path request frame, where NDP is a NAN Data Path, and indicates a NAN data transmission path), an NDP Response Frame (NAN data path response frame), an NDP Confirm Frame (NAN data path confirm frame), and an NDP Key Installment Frame (NAN data path key installment frame). To successfully establish a link between two Wi-Fi Aware devices, at least four active time windows are needed, and time consumption including intervals is more than 1536 TUs. Therefore, it takes a long time to establish the link between the devices.

SUMMARY

In view of this, embodiments of this application provide a Wi-Fi Aware link establishment method and system, an electronic device, and a storage medium, to reduce long duration that is needed to establish a link between Wi-Fi Aware devices.

According to a first aspect, embodiments of this application provide a Wi-Fi Aware link establishment method. The method includes:

a primary device receives first connection information sent by a secondary device, where the first connection information includes a Wi-Fi Aware service name needed by the secondary device, the first connection information further includes a Wi-Fi Aware parameter preconfigured by the secondary device, and the Wi-Fi Aware parameter preconfigured by the secondary device includes parameters exchanged in a service discovery subscribe frame in a Wi-Fi Aware protocol;

the primary device sends second connection information to the secondary device based on the Wi-Fi Aware service name needed by the secondary device, where the second connection information includes confirmation information, the confirmation information is notification information indicating that the primary device confirms that there is the Wi-Fi Aware service name needed by the secondary device, the secondary device confirms, based on the confirmation information, that there is the Wi-Fi Aware service name needed by the secondary device in the primary device, the second connection information further includes a Wi-Fi Aware parameter preconfigured by the primary device, and the Wi-Fi Aware parameter preconfigured by the primary device includes parameters exchanged in a service discovery publish frame in the Wi-Fi Aware protocol;

the primary device obtains a Wi-Fi Aware data path request frame sent by the secondary device; and the primary device completes link establishment with the secondary device based on the Wi-Fi Aware data path request frame.

According to the foregoing aspect and any possible implementation, an implementation is further provided. That a primary device receives first connection information sent by a secondary device includes:

the primary device receives, based on a broadcast function of a BLE Bluetooth module, the first connection information sent by the secondary device.

According to the foregoing aspect and any possible implementation, an implementation is further provided. The second connection information further includes a Wi-Fi Aware timestamp of the primary device, which is used to synchronize a clock of the secondary device.

According to the foregoing aspect and any possible implementation, an implementation is further provided. The method further includes:

the primary device adjusts a timestamp of the clock of the secondary device to be consistent with the Wi-Fi Aware timestamp of the primary device based on the Wi-Fi Aware timestamp sent to the secondary device.

According to the foregoing aspect and any possible implementation, an implementation is further provided. The parameters exchanged in the service discovery subscribe frame in the Wi-Fi Aware protocol include a Wi-Fi Aware management interface MAC address of the secondary device, a Wi-Fi Aware identifier of the secondary device, and data encryption preconfiguration information of the secondary device. The parameters exchanged in the service discovery publish frame in the Wi-Fi Aware protocol include a Wi-Fi Aware management interface MAC address of the primary device, a Wi-Fi Aware identifier of the primary device, and data encryption preconfiguration information of the primary device.

According to the foregoing aspect and any possible implementation, an implementation is further provided. That the primary device completes link establishment with the secondary device based on the Wi-Fi Aware data path request frame includes:

the primary device determines, based on the Wi-Fi Aware parameter preconfigured by the secondary device, whether the Wi-Fi Aware data path request frame is from the secondary device, and sends a Wi-Fi Aware data path response frame to the secondary device in a next active time window if the Wi-Fi Aware data path request frame is from the secondary device; and the primary device completes link establishment with the secondary device after the secondary device receives the Wi-Fi Aware data path response frame.

According to the foregoing aspect and any possible implementation, an implementation is further provided. That the primary device completes link establishment with the secondary device based on the Wi-Fi Aware data path request frame includes:

the primary device determines, based on the Wi-Fi Aware parameter preconfigured by the secondary device, whether the Wi-Fi Aware data path request frame is from the secondary device, and sends a Wi-Fi Aware data path response frame to the secondary device in a next active time window if the Wi-Fi Aware data path request frame is from the secondary device;

the primary device determines whether the Wi-Fi Aware parameter preconfigured by the secondary device includes the data encryption preconfiguration information of the secondary device; and if the Wi-Fi Aware parameter preconfigured by the secondary device includes the data encryption preconfiguration information of the secondary device, the primary device obtains a Wi-Fi Aware data path confirm frame sent by the secondary device;

the primary device determines, based on the Wi-Fi Aware parameter preconfigured by the secondary device, whether the Wi-Fi Aware data path confirm frame is from the secondary device, and sends a Wi-Fi Aware data path key installment frame to the secondary device if the Wi-Fi Aware data path confirm frame is from the secondary device; and the primary device completes link establishment with the secondary device after the secondary device receives the Wi-Fi Aware data path key installment frame.

According to a second aspect, embodiments of this application further provide a Wi-Fi Aware link establishment method, including:

a secondary device sends first connection information to a primary device, where the first connection information includes a Wi-Fi Aware service name needed by the secondary device, the first connection information further includes a Wi-Fi Aware parameter preconfigured by the secondary device, and the Wi-Fi Aware parameter preconfigured by the secondary device includes parameters exchanged in a service discovery subscribe frame in a Wi-Fi Aware protocol;

the secondary device receives second connection information sent by the primary device, where the second connection information includes confirmation information, the confirmation information is notification information indicating that the primary device confirms that there is the Wi-Fi Aware service name needed by the secondary device, the second connection information further includes a Wi-Fi Aware parameter preconfigured by the primary device, and the Wi-Fi Aware parameter preconfigured by the primary device includes parameters exchanged in a service discovery publish frame in the Wi-Fi Aware protocol;

the secondary device confirms, based on the confirmation information, that there is the Wi-Fi Aware service name needed by the secondary device in the primary device; and the secondary device sends a Wi-Fi Aware data path request frame to the primary device, and completes link establishment with the primary device based on the Wi-Fi Aware data path request frame.

According to the foregoing aspect and any possible implementation, an implementation is further provided. That a secondary device sends first connection information to a primary device includes:

the secondary device sends the first connection information to the primary device based on a broadcast function of a BLE Bluetooth module.

According to the foregoing aspect and any possible implementation, an implementation is further provided. The second connection information further includes a Wi-Fi Aware timestamp of the primary device, which is used to synchronize a clock of the secondary device.

According to the foregoing aspect and any possible implementation, an implementation is further provided. The method further includes:

the secondary device adjusts a timestamp of the clock to be consistent with the Wi-Fi Aware timestamp of the primary device based on the received Wi-Fi Aware timestamp of the primary device.

According to the foregoing aspect and any possible implementation, an implementation is further provided. The parameters exchanged in the service discovery subscribe frame in the Wi-Fi Aware protocol include a Wi-Fi Aware management interface MAC address of the secondary device, a Wi-Fi Aware identifier of the secondary device, and data encryption preconfiguration information of the secondary device. The parameters exchanged in the service discovery publish frame in the Wi-Fi Aware protocol include a Wi-Fi Aware management interface MAC address of the primary device, a Wi-Fi Aware identifier of the primary device, and data encryption preconfiguration information of the primary device.

According to the foregoing aspect and any possible implementation, an implementation is further provided. That the secondary device completes link establishment with the primary device based on the Wi-Fi Aware data path request frame includes:

the secondary device sends the Wi-Fi Aware data path request frame to the primary device; and after the primary device determines, based on the Wi-Fi Aware parameter preconfigured by the secondary device, that the Wi-Fi Aware data path request frame is from the secondary device, the secondary device receives, in a next active time window, a Wi-Fi Aware data path response frame sent by the primary device, and completes link establishment with the primary device.

According to the foregoing aspect and any possible implementation, an implementation is further provided. That the secondary device completes link establishment with the primary device based on the Wi-Fi Aware data path request frame includes:

the secondary device sends the Wi-Fi Aware data path request frame to the primary device;

the secondary device receives, in the next active time window, the Wi-Fi Aware data path response frame sent by the primary device after the primary device determines, based on the Wi-Fi Aware parameter preconfigured by the secondary device, that the Wi-Fi Aware data path request frame is from the secondary device;

the secondary device determines whether the Wi-Fi Aware parameter preconfigured by the primary device includes the data encryption preconfiguration information; and if the Wi-Fi Aware parameter preconfigured by the primary device includes the data encryption preconfiguration information, the secondary device sends a Wi-Fi Aware data path confirm frame to the primary device after the secondary device receives the Wi-Fi Aware data path response frame sent by the primary device; and after the primary device determines, based on the Wi-Fi Aware parameter preconfigured by the secondary device, that the Wi-Fi Aware data path confirm frame is from the secondary device, the secondary device receives a Wi-Fi Aware data path key installment frame sent by the primary device, and completes link establishment with the primary device.

According to a third aspect, embodiments of this application provide a Wi-Fi Aware link establishment method, including:

a secondary device sends first connection information to a primary device, where the first connection information includes a Wi-Fi Aware service name needed by the secondary device, the first connection information further includes a Wi-Fi Aware parameter preconfigured by the secondary device, and the Wi-Fi Aware parameter preconfigured by the secondary device includes parameters exchanged in a service discovery subscribe frame in a Wi-Fi Aware protocol;

the primary device receives the first connection information sent by the secondary device;

the primary device sends second connection information to the secondary device based on the Wi-Fi Aware service name needed by the secondary device, where the second connection information includes confirmation information, the confirmation information is notification information indicating that the primary device confirms that there is the Wi-Fi Aware service name needed by the secondary device, the second connection information further includes a Wi-Fi Aware parameter preconfigured by the primary device, and the Wi-Fi Aware parameter preconfigured by the primary device includes parameters exchanged in a service discovery publish frame in the Wi-Fi Aware protocol;

the secondary device receives the second connection information sent by the primary device, and confirms, based on the confirmation information, that there is the Wi-Fi Aware service name needed by the secondary device in the primary device;

the secondary device sends a Wi-Fi Aware data path request frame to the primary device;

the primary device obtains the Wi-Fi Aware data path request frame sent by the secondary device; and the primary device completes link establishment with the secondary device based on the Wi-Fi Aware data path request frame.

According to the foregoing aspect and any possible implementation, an implementation is further provided. That a secondary device sends first connection information to a primary device includes:

the secondary device sends the first connection information to the primary device based on a broadcast function of a BLE Bluetooth module.

According to the foregoing aspect and any possible implementation, an implementation is further provided. The second connection information further includes a Wi-Fi Aware timestamp of the primary device, which is used to synchronize a clock of the secondary device.

According to the foregoing aspect and any possible implementation, an implementation is further provided. The method further includes:

the primary device sends the Wi-Fi Aware timestamp to the secondary device; and the secondary device adjusts a timestamp of the clock to be consistent with the Wi-Fi Aware timestamp of the primary device based on the received Wi-Fi Aware timestamp of the primary device.

According to the foregoing aspect and any possible implementation, an implementation is further provided. The parameters exchanged in the service discovery subscribe frame in the Wi-Fi Aware protocol include a Wi-Fi Aware management interface MAC address of the secondary device, a Wi-Fi Aware identifier of the secondary device, and data encryption preconfiguration information of the secondary device. The parameters exchanged in the service discovery publish frame in the Wi-Fi Aware protocol include a Wi-Fi Aware management interface MAC address of the primary device, a Wi-Fi Aware identifier of the primary device, and data encryption preconfiguration information of the primary device.

According to the foregoing aspect and any possible implementation, an implementation is further provided. That the primary device completes link establishment with the secondary device based on the Wi-Fi Aware data path request frame includes:

the primary device determines, based on the Wi-Fi Aware parameter preconfigured by the secondary device, whether the Wi-Fi Aware data path request frame is from the secondary device, and sends a Wi-Fi Aware data path response frame to the secondary device in a next active time window if the Wi-Fi Aware data path request frame is from the secondary device; and the secondary device receives the Wi-Fi Aware data path response frame, and the primary device completes link establishment with the secondary device.

According to the foregoing aspect and any possible implementation, an implementation is further provided. That the primary device completes link establishment with the secondary device based on the Wi-Fi Aware data path request frame includes:

the primary device determines, based on the Wi-Fi Aware parameter preconfigured by the secondary device, whether the Wi-Fi Aware data path request frame is from the secondary device, and sends a Wi-Fi Aware data path response frame to the secondary device in a next active time window if the Wi-Fi Aware data path request frame is from the secondary device;

the primary device determines whether the Wi-Fi Aware parameter preconfigured by the secondary device includes the data encryption preconfiguration information of the secondary device; and if the Wi-Fi Aware parameter preconfigured by the secondary device includes the data encryption preconfiguration information of the secondary device, the primary device waits to obtain a Wi-Fi Aware data path confirm frame sent by the secondary device;

the secondary device determines whether the Wi-Fi Aware parameter preconfigured by the primary device includes the data encryption preconfiguration information, and sends the Wi-Fi Aware data path confirm frame to the primary device if the Wi-Fi Aware parameter preconfigured by the primary device includes the data encryption preconfiguration information;

the primary device determines, based on the Wi-Fi Aware parameter preconfigured by the secondary device, whether the Wi-Fi Aware data path confirm frame is from the secondary device, and sends a Wi-Fi Aware data path key installment frame to the secondary device if the Wi-Fi Aware data path confirm frame is from the secondary device; and the secondary device receives the Wi-Fi Aware data path key installment frame, and the primary device completes link establishment with the secondary device.

According to a fourth aspect, embodiments of this application provide a Wi-Fi Aware link establishment system. The system includes a primary device and a secondary device, where the primary device is configured to perform the methods in the first aspect, and the secondary device is configured to perform the methods in the second aspect.

According to a fifth aspect, embodiments of this application provide an electronic device. The electronic device includes a memory, a processor, and computer-readable instructions that are stored in the memory and that can be run on the processor. When executing the computer-readable instructions, the processor implements the steps of the method in the first aspect or the second aspect.

According to a sixth aspect, embodiments of this application provide a computer-readable storage medium. The computer-readable storage medium includes computer-readable instructions. When the computer-readable instructions are executed by a processor, the steps of the method in the first aspect or the second aspect are implemented.

In embodiments of this application, the primary device performs device discovery interaction with the secondary device, to determine whether the primary device can provide a Wi-Fi Aware service needed by the secondary device. The secondary device performs a next step of link establishment with the primary device only when the primary device can provide the Wi-Fi Aware service needed by the secondary device. In an interaction process of Wi-Fi Aware device discovery, the first connection information and the second connection information are exchanged, so that in a device discovery process, parameters, which are exchanged in the service discovery subscribe frame and the service discovery publish frame in the Wi-Fi Aware protocol in a link establishment step of the conventional technology, of the primary device and the secondary device are obtained. In a case in which the parameters exchanged in the service discovery subscribe frame and the service discovery publish frame in the Wi-Fi Aware protocol are obtained at a Wi-Fi Aware device discovery stage, the primary device and the secondary device can skip steps of service discovery subscribe and service discovery publish, and complete Wi-Fi Aware link establishment more quickly, to effectively improve a speed of establishing a link between Wi-Fi Aware devices.

BRIEF DESCRIPTION OF THE DRAWINGS

To describe the technical solutions in embodiments of this application more clearly, the following briefly describes the accompanying drawings to be used in embodiments. It is clear that, the accompanying drawings in the following description show merely some embodiments of this application, and a person of ordinary skill in the art may derive other drawings from these accompanying drawings without creative efforts.

DETAILED DESCRIPTION OF ILLUSTRATIVE EMBODIMENTS

The following describes the technical solutions in embodiments of this application with reference to the accompanying drawings in embodiments of this application. In descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more such features. In the descriptions of embodiments of this application, "a plurality of" means two or more than two unless otherwise specified.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

Figure 1:
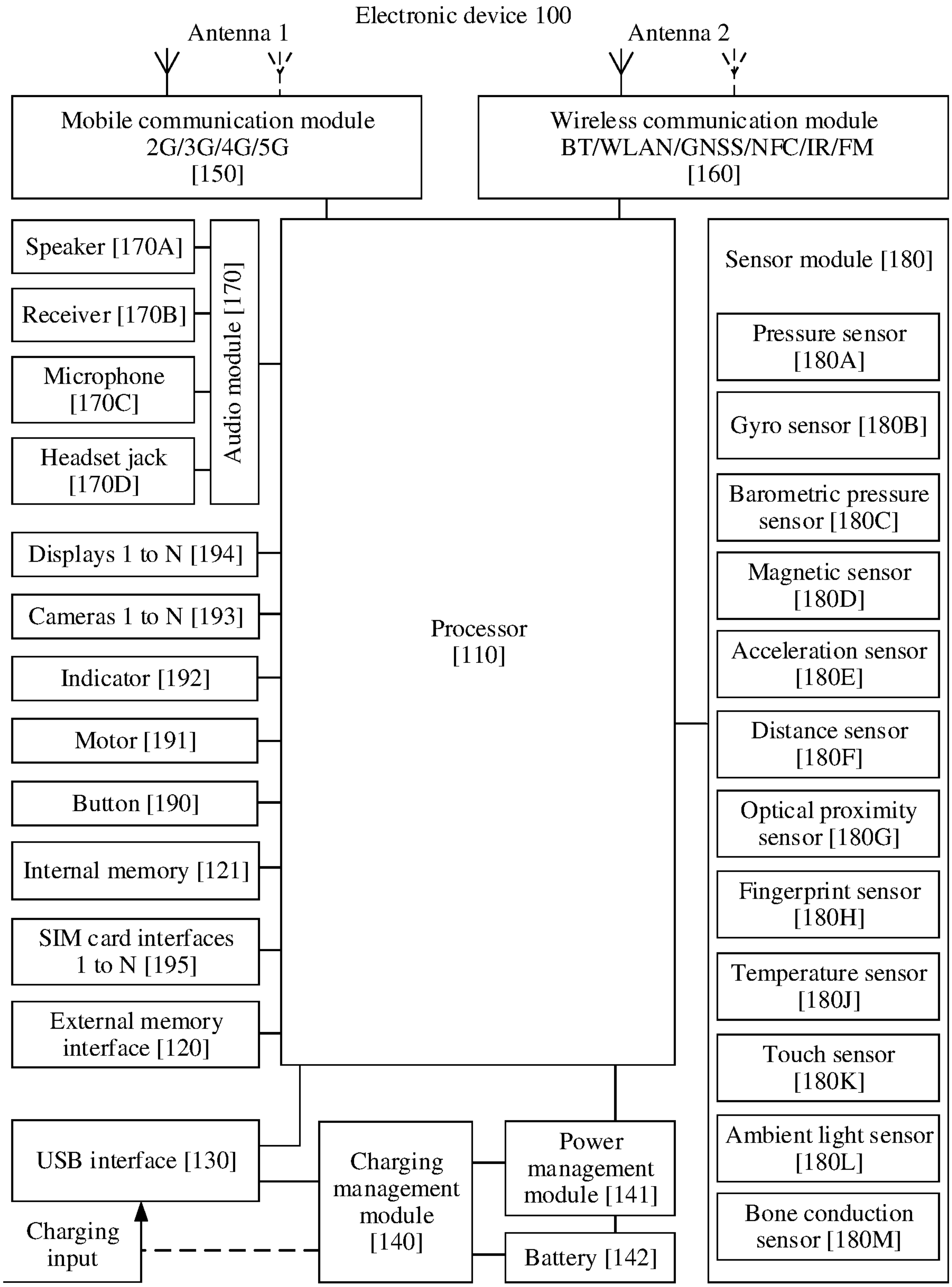
FIG. 1 is a schematic diagram of a structure of an electronic device according to an embodiment of this application.

FIG. 1 is a schematic diagram of a structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may be also configured to perform audio communication, and sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may be alternatively configured as an I2C interface, an I2S interface, a UART interface, a MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device. The USB interface 130 may be alternatively configured to connect to a headset, to play audio by using the headset. The interface may be further configured to connect to another electronic device, for example, an AR device.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may be alternatively disposed in the processor 110. In some other embodiments, the power management module 141 and the charging management module 140 may be alternatively disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the electronic device 100 and that includes wireless communication such as 2G, 3G, 4G, and 5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in a same device as at least some modules of the processor 110.

The modem processor may include a modulator and a demodulator. The modulator is configured to modulate a to-be-sent low-frequency baseband signal into a medium-/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another function module.

The wireless communication module 160 may provide a solution that is applied to the electronic device 100 and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation system, SBAS).

The electronic device 100 implements a display function by using the GPU, the display 194, the application processor, and the like. The GPU is a microprocessor for image processing, and is connected to the display 194 and the application processor. The GPU is configured t: perform mathematical and geometric computation, and render an image. The processor 110 may include one or more GPUs, which execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor AP, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be used to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application needed by at least one function (for example, a voice playing function or an image playing function), and the like. The data storage area may store data (such as audio data and an address book) created during use of the electronic device 100, and the like. In addition, the internal memory 121 may include a high-speed random access memory, or may include a non-volatile memory, for example, at least one magnetic disk storage device, a flash memory device, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When the electronic device 100 is used to answer a call or receive voice information, the receiver 170B may be placed close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be also used in a navigation scenario and a somatic game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover or a smart cover by using the magnetic sensor 180D. In some embodiments, when the electronic device 100 is a flip phone, the electronic device 100 may detect opening and closing of a flip cover by using the magnetic sensor 180D. Further, a feature such as automatic unlocking upon opening of the flip cover is set based on a detected opening or closing state of the smart cover or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 uses the photodiode to detect infrared reflected light from an object nearby. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may be also configured to automatically unlock and lock the screen in a smart cover mode or a pocket mode.

The ambient light sensor 180L is configured to sense ambient light brightness. The electronic device 100 may adaptively adjust brightness of the display 194 based on the sensed ambient light brightness. The ambient light sensor 180L may be also configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 18J. For example, when the temperature reported by the temperature sensor 180J exceeds a threshold, the electronic device 100 reduces performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may be also disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may be also in contact with a body pulse to receive a blood pressure beating signal. In some embodiments, the bone conduction sensor 180M may be also disposed in a headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may be also compatible with an external storage card. The electronic device 100 interacts with a network by using the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In embodiments of this application, an Android system with a layered architecture is used as an example to describe the software structure of the electronic device 100.

Figure 2:
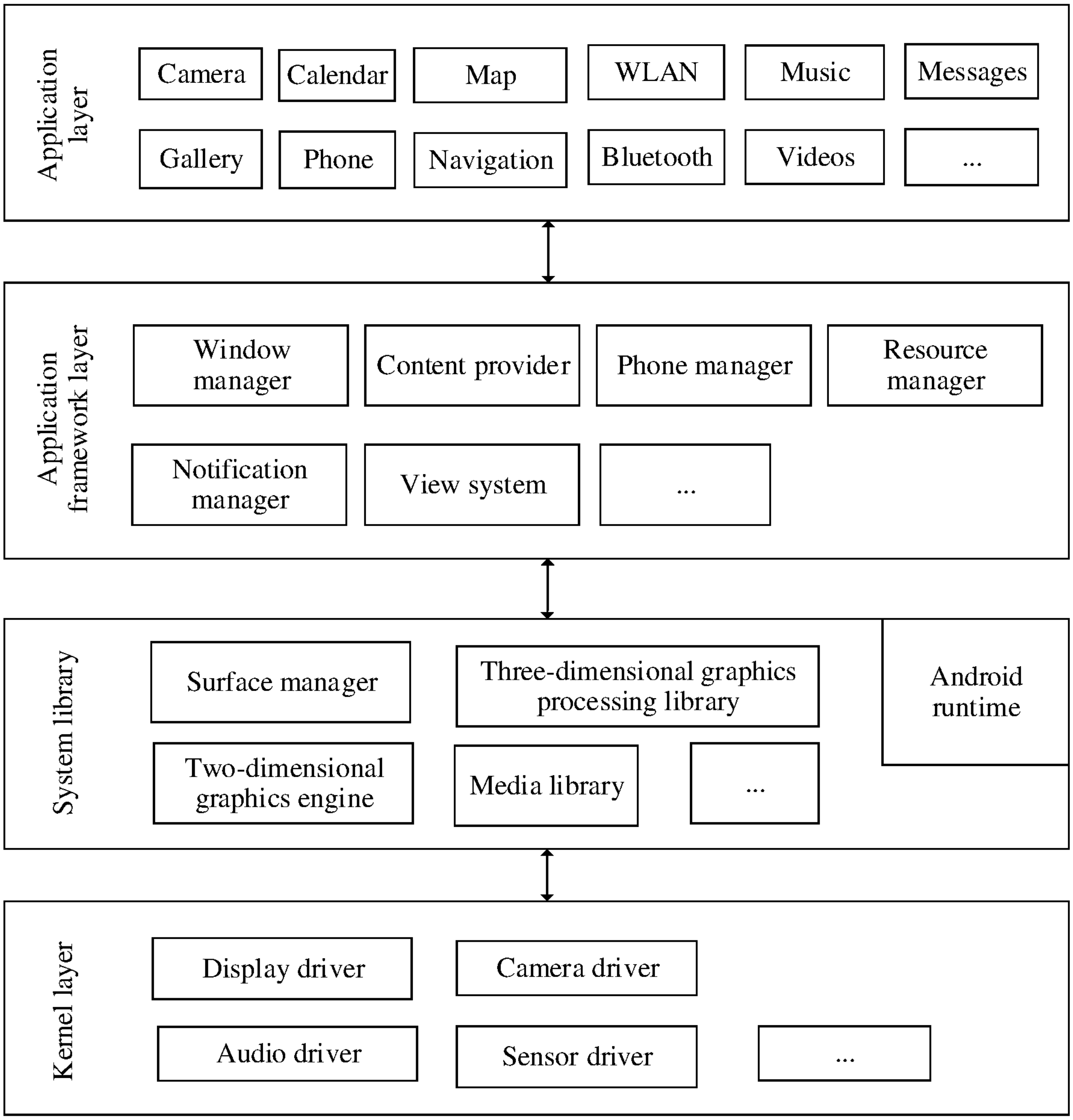
FIG. 2 is a block diagram of a software structure of an electronic device according to an embodiment of this application.

FIG. 2 is a block diagram of a software structure of an electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may be alternatively a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in java language, and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a photographing capture scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of a camera application icon. The camera application invokes an interface of the application framework layer to start the camera application, and then invokes the kernel layer to start the camera driver, to capture a static image or a video by using the camera 193.

In the conventional technology, data communication between Wi-Fi Aware devices generally includes the following four steps.

Step 1: Discover a Cluster.

If a Wi-Fi Aware device (including but not limited to a device such as a mobile phone, a smartwatch, a tablet computer, or a server) discovers another Wi-Fi Aware device within an accessible range, before the two Wi-Fi Aware devices complete link establishment, information is exchanged by using a "discovery beacon frame (Discovery Beacon Frame)", to determine existence of the another Wi-Fi Aware device within the accessible range.

Step 2: Perform Clock Synchronization.

The Wi-Fi Aware device joins a device cluster (cluster) formed by the another Wi-Fi Aware device, and synchronizes a timestamp carried in a discovery beacon. Then, a specific time at which an active time window occurs is calculated based on the timestamp, and during the active time window, communication is performed by using a Wi-Fi Aware data transmission path.

Step 3: Discover a Service.

An application (application, APP for short) on the Wi-Fi Aware device exchanges information by using Wi-Fi Aware (NAN) service discovery frames (including a service discovery publish frame and a service discovery subscribe frame) of a "publish (Publish)" type and a "subscribe (Subscribe)" type. The Wi-Fi Aware device may subscribe to (search for) a discovery service during the active time window. The Wi-Fi Aware device may alternatively publish (send), during the active time window, broadcast information indicating existence of the Wi-Fi Aware device and service content that can be provided.

Step 4: Establish a Data Link.

When the Wi-Fi Aware device searches for a needed Wi-Fi Aware service, the device that initiates searching may send a data link establishment request to a detected Wi-Fi Aware device during the active time window, which may be specifically implemented by exchanging information of a Wi-Fi Aware data path request frame. The device that receives a service request frame responds with a Wi-Fi Aware data path response frame during next active time window. If security encryption is involved in data link establishment, information of a Wi-Fi Aware data path confirm frame and a Wi-Fi Aware data path key installment frame needs to be exchanged additionally during the active time window.

Wi-Fi Aware specifies that there is an active time window of 16 TUs at an interval of 512 TUs. Only during the active time window, each Wi-Fi Aware device can perform interaction on data frames in a Wi-Fi Aware protocol, such as a service discovery frame, a Wi-Fi Aware (NAN) data path request frame, a Wi-Fi Aware data path response frame, a Wi-Fi Aware data path confirm frame, and a Wi-Fi Aware data path key installment frame.

Figure 3A:
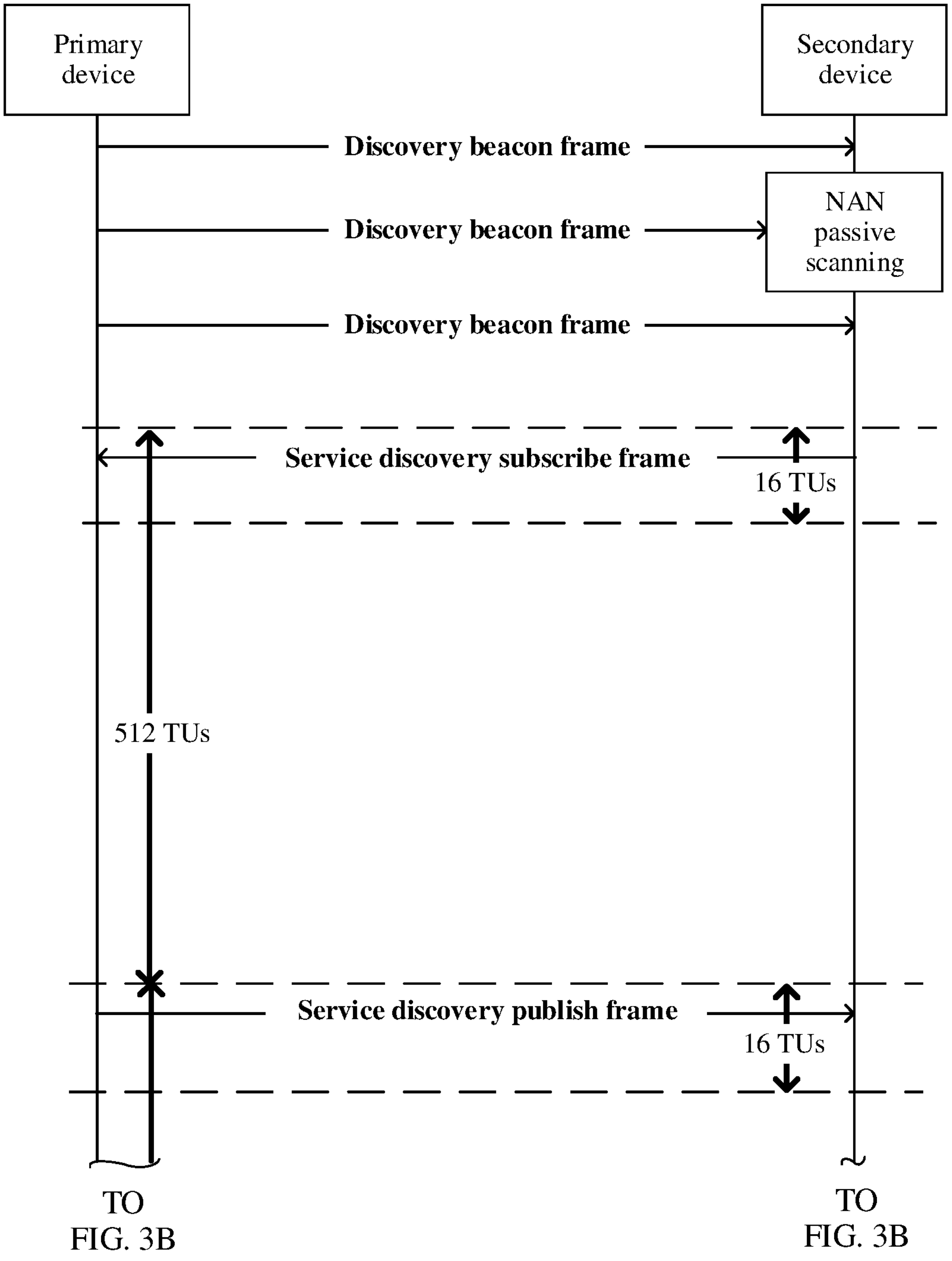
FIG. 3A and FIG. 3B are a flowchart of a Wi-Fi Aware link establishment method according to an embodiment of this application.
Figure 3B:
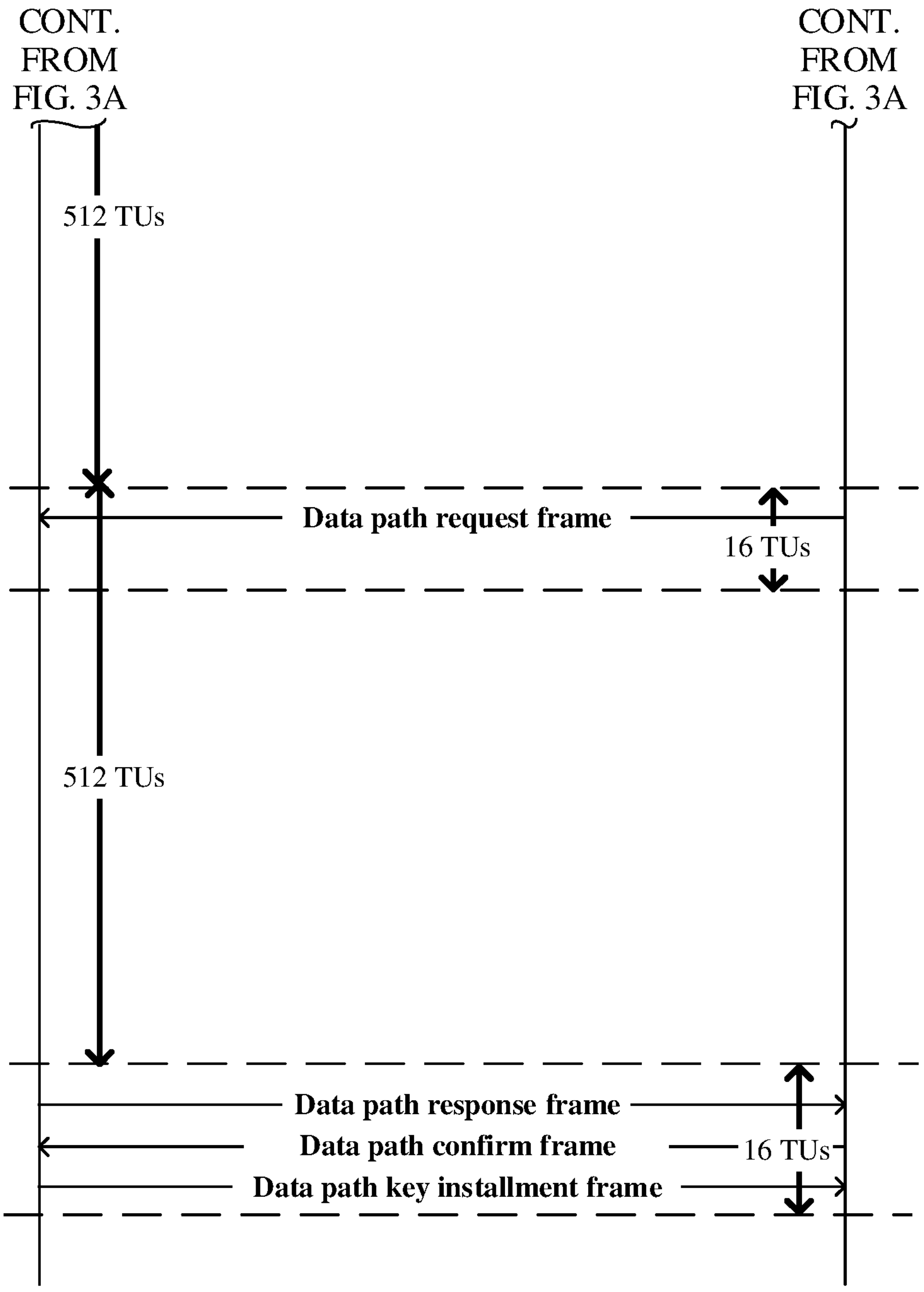

As shown in FIG. 3A and FIG. 3B, a primary device broadcasts a discovery beacon frame on a predetermined channel, to enable another device to discover a cluster that has been created by the primary device. A secondary device wakes up, listens to the discovery beacon frame on the predetermined channel, and synchronizes a Wi-Fi Aware clock of the secondary device to a Wi-Fi Aware timestamp carried in the discovery beacon frame after the discovery beacon frame is detected through listening.

It should be noted that each Wi-Fi Aware device holds a clock with precision of "one microsecond", and the timestamp increases by one every microsecond. The discovery beacon frame sent by the primary device carries a timestamp of the primary device, and after receiving the discovery beacon frame sent by the primary device, the secondary device changes a timestamp of the clock of the secondary device to be consistent with the timestamp carried in the discovery beacon frame sent by the primary device, to implement clock synchronization between the primary device and the secondary device.

It may be understood that a start time of each active time window is a moment at which a timestamp exactly divided by 512 TUs is zero, that is, each moment at which Value (timestamp) mod $512\times1024=0$ is a start time of an active time window, where each active time window lasts for 16 TUs. Further, the secondary device actively queries, during the active time window by sending a Service Discovery Subscribe Frame (service discovery subscribe frame) in a service discovery frame, a device that can provide a needed Wi-Fi Aware service. After receiving the service discovery subscribe frame sent by the secondary device, the primary device responds with/sends, in a next active time window, a Service Discovery Publish Frame (service discovery publish frame) in the service discovery frame if the primary device determines that the primary device can provide the Wi-Fi Aware service needed by the secondary device. Then, in next two active time windows, the primary device and the secondary device complete data link establishment by sequentially exchanging a Wi-Fi Aware data path request frame, a Wi-Fi Aware data path response frame, a Wi-Fi Aware data path confirm frame, and a Wi-Fi Aware data path key installment frame.

It may be understood that although Wi-Fi Aware is designed in terms of low power consumption, if the secondary device expects to subscribe to a Wi-Fi Aware service, but there is no primary device that can provide a corresponding service nearby, the secondary device periodically wakes up a Wi-Fi module of the secondary device, to perform operations such as passive listening and sending a service discovery subscribe frame. Apparently, a large quantity of battery resources are consumed by frequently waking up the Wi-Fi module to discover a Wi-Fi Aware device.

In addition, the Wi-Fi Aware specifies that only 16 TUs at an interval of 512 TUs allows information exchange in the Wi-Fi Aware data path request frame, the Wi-Fi Aware data path response frame, the Wi-Fi Aware data path confirm frame, the Wi-Fi Aware data path key installment frame, and the like. Therefore, to successfully establish a link between two Wi-Fi Aware devices, at least four active time windows are needed, and time consumption including intervals is more than 1536 TUs (512 TUs×3).

In the conventional technology, to resolve a problem that a large quantity of the battery resources are consumed due to the fact that the secondary device frequently wakes up the Wi-Fi module to discover the Wi-Fi Aware device, mutual discovery between Wi-Fi Aware devices may be implemented by using Bluetooth Low Energy (Bluetooth Low Energy, BLE). Specifically, the Wi-Fi Aware devices communicate with each other in a BLE broadcast manner by using features of low power consumption and low throughput of the BLE. If first connection information sent by the primary device includes a Wi-Fi Aware service name needed by the secondary device, the secondary device wakes up the Wi-Fi module of the secondary device to establish a data link with the primary device.

Figure 4A:
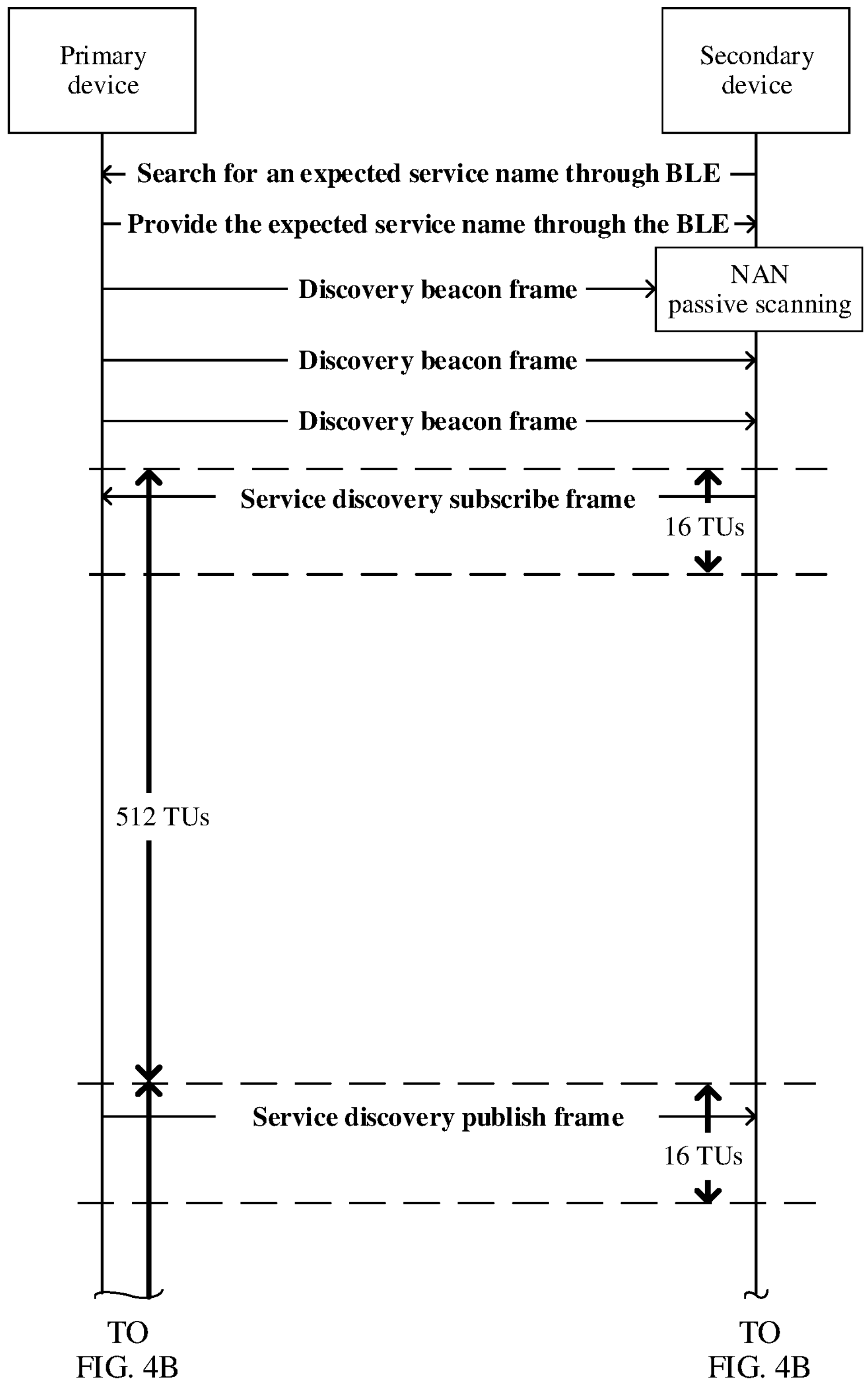
FIG. 4A and FIG. 4B are a flowchart of still another Wi-Fi Aware link establishment method according to an embodiment of this application.
Figure 4B:
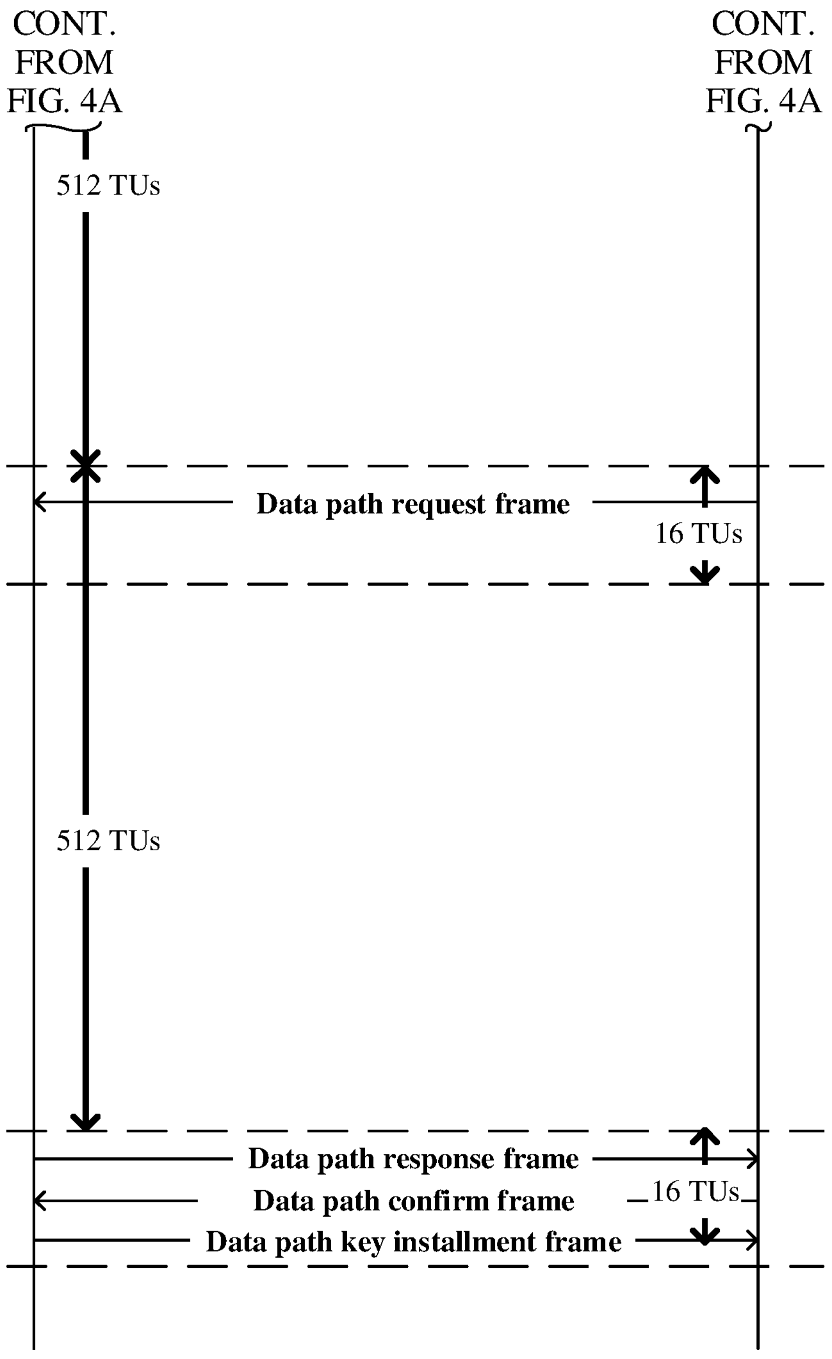

Specifically, as shown in FIG. 4A and FIG. 4B, before waking up the Wi-Fi module to perform passive monitoring, the secondary device first performs periodic broadcasting through the BLE, and adds the Wi-Fi Aware service name of the needed Wi-Fi Aware service to the first connection information. If the primary device can provide the Wi-Fi Aware service, after receiving the first connection information broadcast through the BLE, the primary device also notifies, in the BLE broadcast manner, the secondary device that the primary device can provide the service. Then, the secondary device wakes up the Wi-Fi module to perform passive listening, to listen to the discovery beacon frame sent by the primary device. Then, steps are the same as those in FIG. 3A and FIG. 3B, and the data link is established between the secondary device and the primary device.

The foregoing BLE is an ultralow-power-consumption near-field-communication solution for a mobile terminal launched by a Bluetooth Special Interest Group in 2016. It can be seen from Table 1 below that operating power consumption of the BLE is less than that of Wi-Fi no matter during sleep or during message receiving and transmission. According to power consumption consumed by exchanging 10 messages per day, the operating power consumption of the BLE is only one tenth of operating power consumption of Wi-Fi, and is far less than that of the Wi-Fi.

Because the BLE has the features of ultra-low power consumption and low throughput, the BLE may be applied to mutual discovery between devices.

TABLE 1

| | Wi-Fi | Bluetooth Low Energy |
|---|---|---|
| Sleep | 10 µW | 8 µW |
| Receive (Rx) Power | 90 mW | 28.5 mW |
| Transmit (Tx) Power | 350 mW | 26.5 mW |
| Average Power for 10 Messages Per Day | 500 µW | 50 µW |

It may be understood that although the BLE is used to resolve the problem that a large quantity of the battery resources are consumed due to the fact that the secondary device frequently wakes up the Wi-Fi module to perform Wi-Fi Aware device discovery, after waking up the Wi-Fi module, the secondary device still needs to perform passive listening for a period of time to receive the discover beacon frame sent by the primary device, to synchronize with a clock of a cluster in which the primary device is located, and then correctly enters the active time window to perform Wi-Fi Aware device discovery and data link establishment.

It may be understood that, although the BLE is used, a problem that a time for discovering a Wi-Fi Aware device and establishing a data link is long and exceeds 1536 TUs has not been resolved yet.

Specifically, the following implementation may be used to resolve the foregoing existing problem.

First, device discovery between the primary device and the secondary device is performed.

S11: The secondary device sends the first connection information to the primary device based on a broadcast function of a BLE Bluetooth module, where the first connection information includes the Wi-Fi Aware service name needed by the secondary device, the first connection information further includes a Wi-Fi Aware parameter preconfigured by the secondary device, and the Wi-Fi Aware parameter preconfigured by the secondary device includes parameters exchanged in the service discovery subscribe frame in a Wi-Fi Aware protocol.

S12: The primary device receives, based on a broadcast function of a BLE Bluetooth module, the first connection information sent by the secondary device.

S13: The primary device sends second connection information to the secondary device based on the Wi-Fi Aware service name needed by the secondary device, where the second connection information includes confirmation information, the confirmation information is notification information indicating that the primary device confirms that there is the Wi-Fi Aware service name needed by the secondary device, the secondary device confirms, based on the confirmation information, that there is the Wi-Fi Aware service name needed by the secondary device in the primary device, the second connection information further includes a Wi-Fi Aware parameter preconfigured by the primary device, and the Wi-Fi Aware parameter preconfigured by the primary device includes parameters exchanged in a service discovery publish frame in the Wi-Fi Aware protocol.

After the device discovery between the primary device and the secondary device is completed, steps of service discovery subscribe and service discovery pushing in the conventional technology are skipped by using the Wi-Fi Aware parameter preconfigured by the secondary device in the first connection information and the Wi-Fi Aware parameter preconfigured by the primary device in the second connection information, and the following steps are directly performed.

S14: The primary device obtains a Wi-Fi Aware data path request frame sent by the secondary device.

S15: The primary device completes link establishment with the secondary device based on the Wi-Fi Aware data path request frame.

It may be understood that in steps S11 to S13, an interaction process of Wi-Fi Aware device discovery between the primary device and the secondary device may be implemented by using a Bluetooth module. Specifically, the interaction process may be implemented by using the BLE Bluetooth module. The BLE has the features of low power consumption and low throughput. The operating power consumption of the BLE is far less than that of the Wi-Fi no matter during sleep or during message receiving and transmission.

The primary device and the secondary device are not fixed for the device, and a same device may serve as either a primary device or a secondary device. Specifically, a device whose clock is synchronized is a secondary device.

The Wi-Fi Aware service may specifically refer to a service such as file sharing, photo inter-transmission, and providing game session joining.

In an embodiment, the secondary device uses the BLE Bluetooth module to perform Wi-Fi Aware device discovery interaction with the primary device. Compared with an original manner that the Wi-Fi module is woken up to perform passive listening, consumed power is lower, the Wi-Fi module does not need to be continuously woken up, and the battery resources consumed by the device can be effectively reduced.

The first connection information broadcast by the BLE Bluetooth module is carried in a packet. Specifically, two types of packets are included: a broadcast packet and a data packet. It may be understood that a device discovers and is connected to another device by using a broadcast packet. Once device connection is established, a data packet is used. In an embodiment, the Wi-Fi Aware service name needed by the secondary device is carried in the data packet. Further, a data structure of the data packet is a header structure, a data payload structure (payload), and a message integrity check structure (Message Integrity Check, MIC). The Wi-Fi Aware service name is specifically stored in the data payload structure.

The Wi-Fi Aware service name refers to an identifier of a service, and can be used to uniquely determine the Wi-Fi Aware service. For example, the Wi-Fi Aware service name may be a name related to file sharing, photo inter-transmission, or game session joining. Another identifier that can uniquely determine the Wi-Fi Aware service may be referred to as the Wi-Fi Aware service name. The Wi-Fi Aware service name is not only used to limit a presented name herein, or may be another identifier that can uniquely determine the Wi-Fi Aware service.

In an embodiment, when performing broadcasting, the secondary device already adds the needed Wi-Fi Aware service name to the first connection information, so that the primary device can receive the first connection information by using the BLE Bluetooth module, and obtain the Wi-Fi Aware service name carried in the first connection information.

It may be understood that, before establishing a link between the primary device and the secondary device, whether the primary device can provide the Wi-Fi Aware service needed by the secondary device is first determined. If the primary device does not have the Wi-Fi Aware service that can be provided, the secondary device does not need to implement passive listening by waking up the Wi-Fi module once at intervals, and the Wi-Fi module may be woken up to perform passive listening when it is determined that the primary device has the Wi-Fi Aware service needed by the secondary device, to effectively reduce consumption of a power supply.

In an embodiment, after receiving the first connection information from the secondary device, the primary device determines, based on the Wi-Fi Aware service name in the first connection information, whether the primary device can provide the needed service in the first connection information for the secondary device. If the primary device cannot provide the needed service in the first connection information for the secondary device, the BLE Bluetooth module may choose to be in a dormant state, to reduce battery resource consumption of the device.

Specifically, the primary device determines, in a character string comparison manner, whether the primary device can provide the needed service in the first connection information for the secondary device. It may be understood that the Wi-Fi Aware service name refers to an identifier of the Wi-Fi Aware service, and the Wi-Fi Aware service can be uniquely determined by using the Wi-Fi Aware service name. For example, in a scenario of joining a game session, the Wi-Fi Aware service name includes a game name, a game version number, and a service identifier used to indicate to provide the Wi-Fi Aware service, and the secondary device sends the Wi-Fi Aware service name based on the needed service in the first connection information. If the primary device finds, through character string comparison, that a Wi-Fi Aware service that can be provided by the primary device can match the Wi-Fi Aware service needed by the secondary device, the primary device has the Wi-Fi Aware service needed by the secondary device.

In steps S11 to S13, the BLE Bluetooth module is used to perform Wi-Fi Aware device discovery interaction between the primary device and the secondary device, to effectively reduce battery resources consumed by the device. In addition, before the device establishes a link, it is determined in advance whether the primary device has the Wi-Fi Aware service needed by the secondary device, so that the BLE Bluetooth module does not need to be always in an activated state, to effectively reducing the battery resources consumed by the device.

In the interaction process of Wi-Fi Aware device discovery (steps S11 to S13), the first connection information further includes the Wi-Fi Aware parameter preconfigured by the secondary device. The Wi-Fi Aware parameter preconfigured by the secondary device includes the parameters exchanged in the service discovery subscribe frame in the Wi-Fi Aware protocol. The second connection information further includes the Wi-Fi Aware parameter preconfigured by the primary device. The Wi-Fi Aware parameter preconfigured by the primary device includes the parameters exchanged in the service discovery publish frame in the Wi-Fi Aware protocol.

Further, the parameters exchanged in the service discovery subscribe frame in the Wi-Fi Aware protocol include a Wi-Fi Aware management interface MAC address of the secondary device, a Wi-Fi Aware identifier of the secondary device, and data encryption preconfiguration information of the secondary device. The parameters exchanged in the service discovery publish frame in the Wi-Fi Aware protocol include a Wi-Fi Aware management interface MAC address of the primary device, a Wi-Fi Aware identifier of the primary device, and data encryption preconfiguration information of the primary device.

A MAC address (Media Access Control Address) is referred to as a local area network address or a physical address (Physical Address), and is an address used to determine a location of a network device. A Wi-Fi Aware identifier is an identifier that can uniquely identify a use object of the Wi-Fi Aware, for example, may be represented in an ID manner. Data encryption preconfiguration information refers to a preconfigured data encryption manner (for example, a data encryption algorithm). If the primary device obtains the data encryption preconfiguration information of the secondary device, the primary device may decrypt, based on the data encryption preconfiguration information, data obtained from the secondary device.

It may be understood that both the primary device and the secondary device may include information such as the Wi-Fi Aware management interface MAC address, the Wi-Fi Aware identifier, and the data encryption preconfiguration information. The primary device and the secondary device may establish a data link based on the information, to implement information exchange.

Further, the second connection information further includes a Wi-Fi Aware timestamp of the primary device. The Wi-Fi Aware timestamp of the primary device is used to synchronize a clock of the secondary device.

A length of the Wi-Fi Aware timestamp may be specifically 8 bytes. The timestamp increases by one every microsecond.

It can be learned from FIG. 4A and FIG. 4B that after determining that the primary device can provide the needed Wi-Fi Aware service, the secondary device still needs to perform a passive listening process to implement clock synchronization. In an embodiment, in the interaction process of Wi-Fi Aware device discovery between the primary device and the secondary device, the second connection information exchanged between the primary device and the secondary device further includes the Wi-Fi Aware timestamp of the primary device. The secondary device may synchronize the clock of the secondary device with a clock of the primary device based on the Wi-Fi Aware timestamp. It may be understood that only after the clock of the primary device and the clock of the secondary device are consistent, information exchange can be performed during a same active time window.

It may be understood that, in the conventional technology, when a device performs Wi-Fi Aware link establishment protocol, the following fixed steps are included: service discovery subscribe of a secondary device and service discovery publish of a primary device (data is transmitted in a manner of the service discovery subscribe frame during service discovery subscribe, and data is transmitted in a manner of the service discovery publish frame during service discovery publish). The two steps are a basis for establishing information exchange between the primary device and the secondary device, and information about a connected device is determined by using, for example, a Wi-Fi Aware management interface MAC address and a Wi-Fi Aware identifier of the device, so that information can be exchanged between the devices based on the information. It should be noted that, the service discovery subscribe and the service discovery publish are different from the Wi-Fi Aware device discovery. The Wi-Fi Aware device discovery is to determine whether the primary device has the Wi-Fi Aware service needed by the secondary device, and is only to predetermine a Wi-Fi Aware service that can be provided and whether there is a corresponding device that provides the service.

It may be understood that in the conventional technology, because the steps of service discovery subscribe and service discovery publish are used in a link establishment process, duration of link establishment is long, and at least two active time windows are needed to complete link establishment.

In an embodiment, in the interaction process of Wi-Fi Aware device discovery, during link establishment between the primary device and the secondary, the parameters exchanged in the service discovery subscribe frame in the Wi-Fi Aware protocol and the parameters exchanged in the service discovery publish frame in the Wi-Fi Aware protocol are also exchanged, so that when the secondary device determines whether the primary device can provide the needed Wi-Fi Aware service, the parameters exchanged in the service discovery subscribe frame in the Wi-Fi Aware protocol and the parameters exchanged in the service discovery publish frame in the Wi-Fi Aware protocol are have been exchanged in advance. The steps of service discovery subscribe and service discovery publish may be skipped, and subsequent link establishment steps (steps S14 to S15) are directly performed, to improve efficiency of establishing a link between the devices.

It may be understood that when the primary device has the Wi-Fi Aware service needed by the secondary device, the primary device may directly perform a subsequent link establishment operation with the secondary device based on the first connection information and the second connection information, and does not need to exchange the parameters exchanged in the service discovery subscribe frame in the Wi-Fi Aware protocol and the parameters exchanged in the service discovery publish frame in the Wi-Fi Aware protocol at an interval of at least two active time windows. The primary device may complete link establishment with the secondary device based on the information such as the Wi-Fi Aware management interface MAC address and the Wi-Fi Aware identifier, and the steps of service discovery subscribe and service discovery publish are omitted.

Further, this method further specifically includes the following step:

A timestamp of the clock of the secondary device is adjusted to be consistent with the Wi-Fi Aware timestamp of the primary device based on the Wi-Fi Aware timestamp that is sent to the secondary device by the primary device.

In an embodiment, a clock synchronization manner may be specifically that the Wi-Fi Aware timestamp of the secondary device and the Wi-Fi Aware timestamp of the primary device are synchronously updated, to enable the Wi-Fi Aware timestamp of the secondary device to be consistent with the Wi-Fi Aware timestamp of the primary device.

Further, step S15, that is, the primary device completes link establishment with the secondary device based on the Wi-Fi Aware data path request frame, specifically includes the following steps.

S211: The primary device determines, based on the Wi-Fi Aware parameter preconfigured by the secondary device, whether the Wi-Fi Aware data path request frame is from the secondary device, and sends a Wi-Fi Aware data path response frame to the secondary device in a next active time window if the Wi-Fi Aware data path request frame is from the secondary device.

S212: The primary device completes link establishment with the secondary device after the secondary device receives the Wi-Fi Aware data path response frame.

In an embodiment, the primary device needs to determine a source of the Wi-Fi Aware data path request frame. If determining succeeds, the primary device responds to the secondary device. Specifically, the primary device sends the Wi-Fi Aware data path response frame to the secondary device.

Further, after determining that the Wi-Fi Aware data path request frame is from the secondary device, the primary device may further refuse to respond to the secondary device based on a preset processing manner. For example, if the primary device presets a processing manner of "refusing to perform Wi-Fi Aware link establishment with any device", even if it is determined that the Wi-Fi Aware data path request frame is from the secondary device, the primary device does not respond to the secondary device.

In S211 to S212, a specific implementation in which the primary device completes link establishment with the secondary device based on the Wi-Fi Aware data path request frame is provided, and the data link establishment is completed by using the Wi-Fi Aware data path request frame and the Wi-Fi Aware data path response frame.

Further, if data encryption is needed in a data exchange process after link establishment, that the primary device completes link establishment with the secondary device based on the Wi-Fi Aware data path request frame specifically includes the following steps.

S221: The primary device determines, based on the Wi-Fi Aware parameter preconfigured by the secondary device, whether the Wi-Fi Aware data path request frame is from the secondary device, and sends a Wi-Fi Aware data path response frame to the secondary device in a next active time window if the Wi-Fi Aware data path request frame is from the secondary device.

S222: The primary device determines whether the Wi-Fi Aware parameter preconfigured by the secondary device includes data encryption preconfiguration information of the secondary device; and if the Wi-Fi Aware parameter preconfigured by the secondary device includes the data encryption preconfiguration information of the secondary device, the primary device waits to obtain a Wi-Fi Aware data path confirm frame sent by the secondary device.

S223: The secondary device determines whether the Wi-Fi Aware parameter preconfigured by the primary device includes data encryption preconfiguration information, and sends the Wi-Fi Aware data path confirm frame to the primary device if the Wi-Fi Aware parameter preconfigured by the primary device includes the data encryption preconfiguration information.

S224: The primary device determines, based on the Wi-Fi Aware parameter preconfigured by the secondary device, whether the Wi-Fi Aware data path confirm frame is from the secondary device, and sends a Wi-Fi Aware data path key installment frame to the secondary device if the Wi-Fi Aware data path confirm frame is from the secondary device.

S225: The secondary device receives the Wi-Fi Aware data path key installment frame, and completes link establishment with the primary device.

It may be understood that, if the data encryption is needed in the data exchange process after link establishment, the primary device provides key installation for the secondary device in the link establishment process, and the data encryption is specifically implemented by sending the Wi-Fi Aware data path key installment frame, so that the secondary device can complete key installation based on the Wi-Fi Aware data path key installment frame, and the primary device and the secondary device may exchange data in an encryption manner agreed upon by the primary device and the secondary device.

In steps S221 to S225, a specific implementation in which the primary device completes link establishment with the secondary device based on the Wi-Fi Aware data path request frame is provided. The data link establishment is completed by using the Wi-Fi Aware data path request frame, the Wi-Fi Aware data path response frame, the Wi-Fi Aware data path confirm frame, and the Wi-Fi Aware data path key installment frame.

Figure 5A:
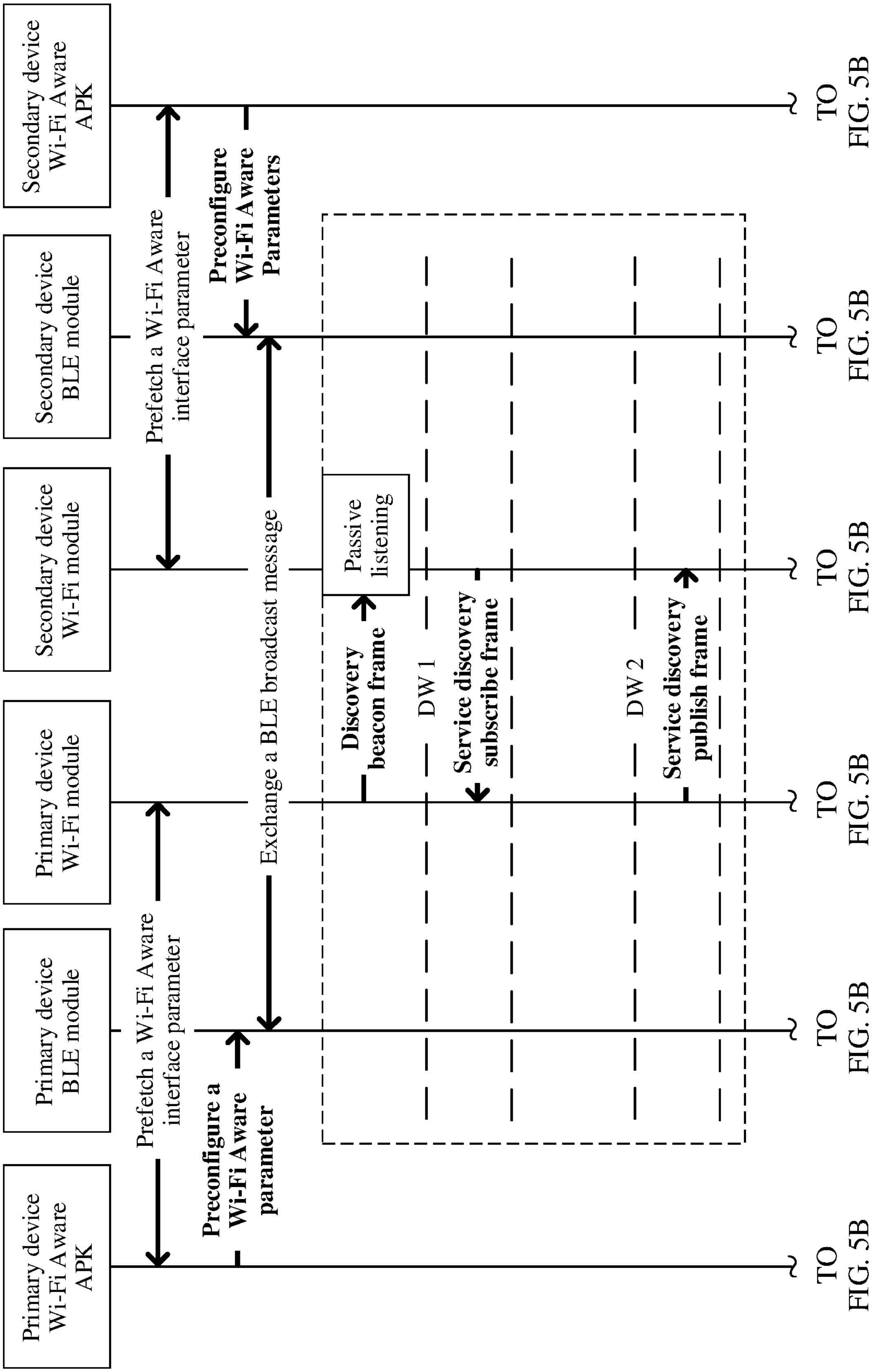
FIG. 5A and FIG. 5B are a flowchart in which Wi-Fi Aware completes link establishment by using an application according to an embodiment of this application.
Figure 5B:
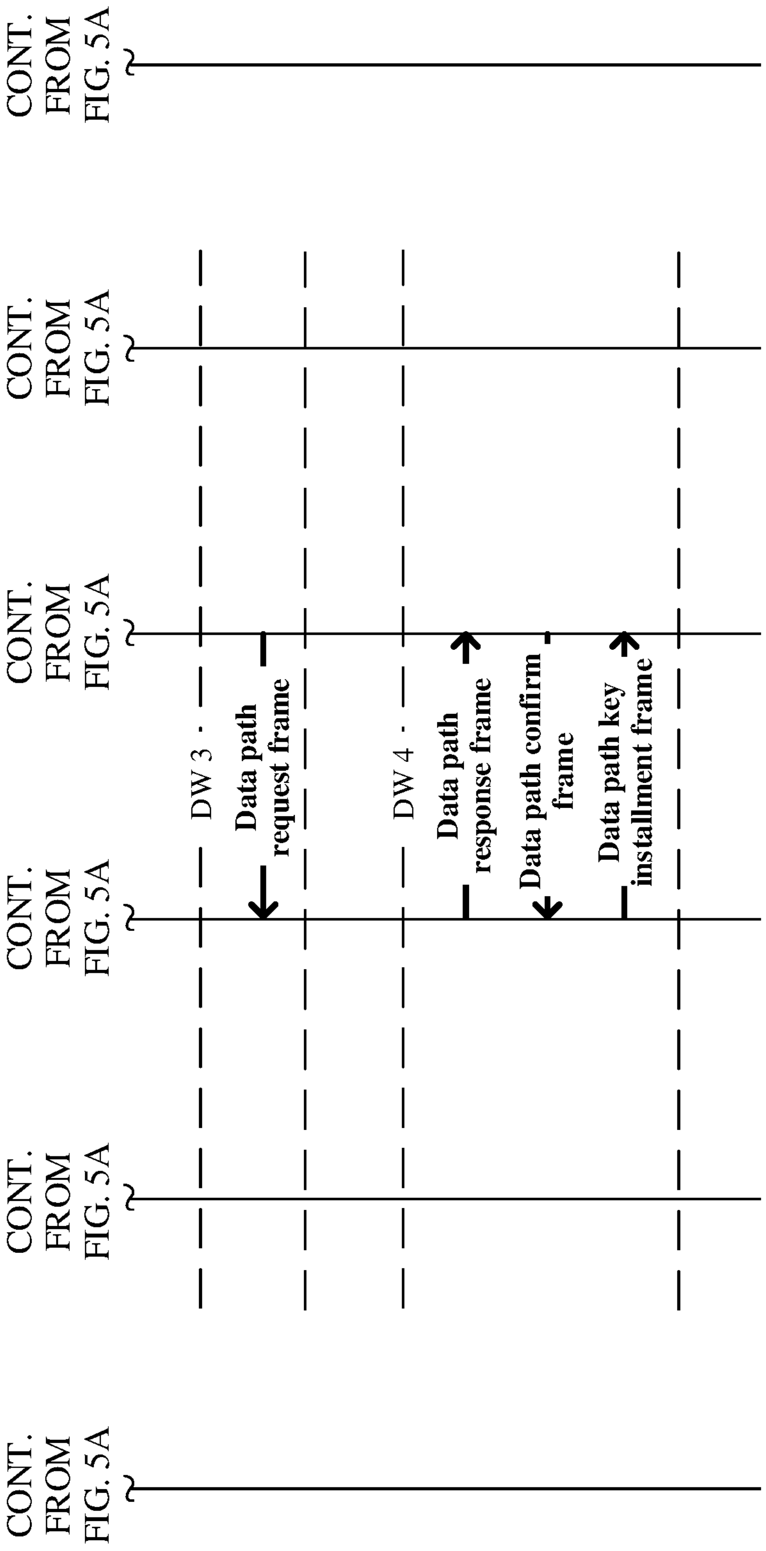

In an embodiment, FIG. 5A and FIG. 5B are a flowchart in which Wi-Fi Aware completes link establishment by using an application.

It can be learned from FIG. 5A and FIG. 5B that, in this application, in a Wi-Fi Aware device discovery process, Wi-Fi Aware parameters preconfigured by a primary device and a secondary device are exchanged in advance (a Wi-Fi Aware interface parameter is first obtained from a Wi-Fi module, and then the interface parameter and the Wi-Fi Aware parameters of a device is delivered to a BLE module as first connection information or second connection information), steps of service discovery subscribe and service discovery publish in a dashed-line box are skipped, and data frames in a Wi-Fi Aware protocol, such as a Wi-Fi Aware data path request frame, a Wi-Fi Aware data path response frame, a Wi-Fi Aware data path confirm frame, and a Wi-Fi Aware data path key installment frame, are directly exchanged to complete data link establishment, to effectively improve efficiency of establishing a link.

Figure 6:
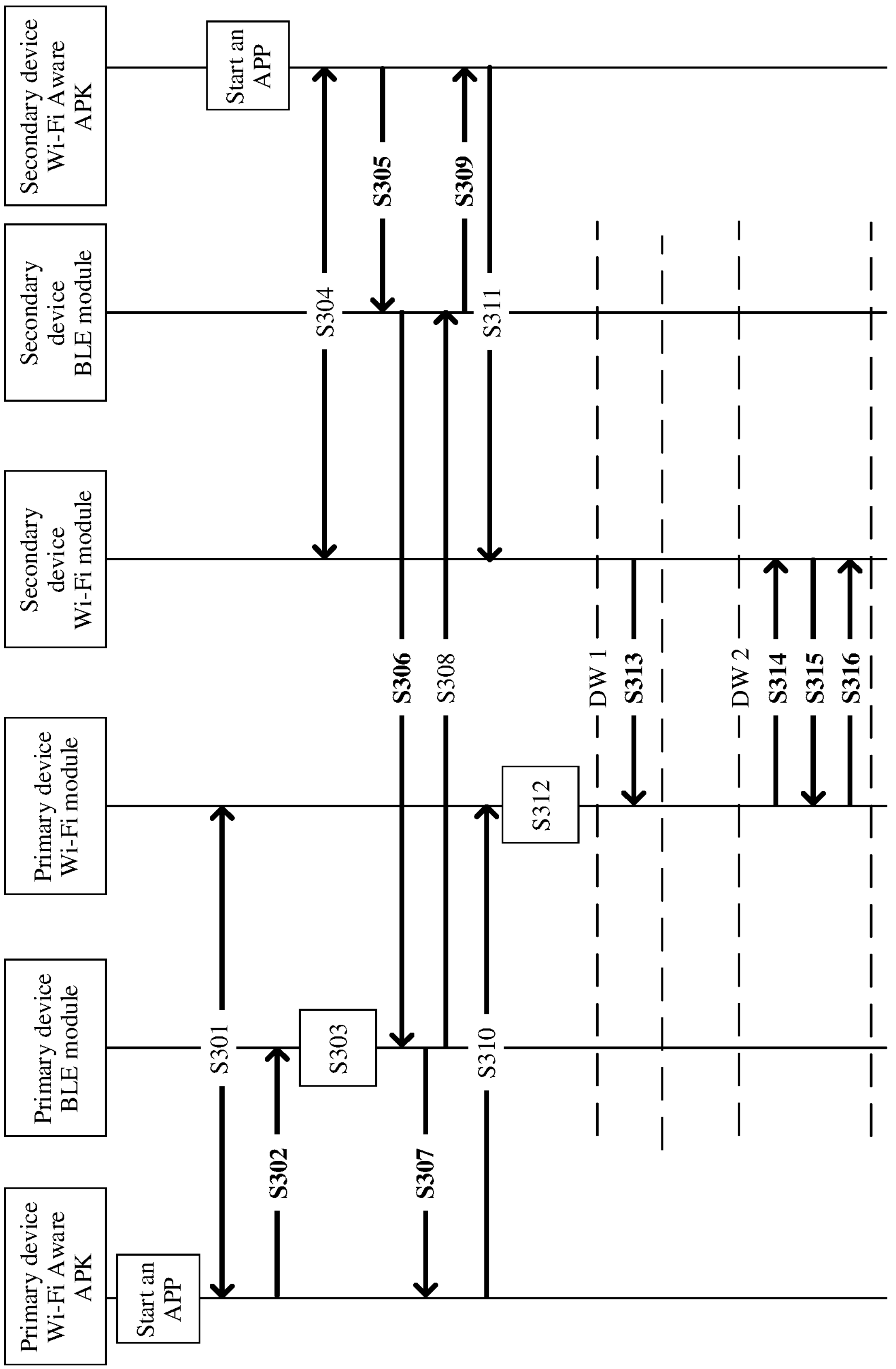
FIG. 6 is still another flowchart in which Wi-Fi Aware completes link establishment by using an application according to an embodiment of this application.

In an embodiment, FIG. 6 is still another flowchart in which Wi-Fi Aware completes link establishment by using an application. Steps shown in FIG. 6 are specifically as follows.

A specific technology in this application is Wi-Fi Aware. For ease of representation, for example, a Wi-Fi Aware (NAN) data path request frame may be simply represented as a data path request frame, and a prefix is omitted.

S301: After starting an application based on a Wi-Fi Aware APK (Android application package, Android application package), a primary device obtains a Wi-Fi Aware parameter from a Wi-Fi module, where the Wi-Fi Aware parameter includes a Wi-Fi Aware management interface MAC address and a Wi-Fi Aware timestamp.

S302: The Wi-Fi Aware APK of the primary device delivers first connection information as follows to a BLE Bluetooth module: a serviceable Wi-Fi Aware service name, a Wi-Fi Aware ID, the Wi-Fi Aware management interface MAC address, a Wi-Fi Aware security preconfiguration parameter, and the Wi-Fi Aware timestamp.

S303: The BLE Bluetooth module of the primary device passively listens to a surrounding broadcast BLE message based on the first connection information delivered in step S302, to identify whether there is a matched Wi-Fi Aware device that can be served.

S303. A Wi-Fi Aware APK of a secondary device obtains a Wi-Fi Aware parameter from a Wi-Fi module, where the Wi-Fi Aware parameter includes a Wi-Fi Aware management interface MAC address.

S305: The Wi-Fi Aware APK of the secondary device delivers second connection information as follows to a BLE Bluetooth module: a Wi-Fi Aware service name of a service that is expected to obtain, a Wi-Fi Aware ID, the Wi-Fi Aware management interface MAC address, and a Wi-Fi Aware security preconfiguration parameter.

S306: The secondary device enables the BLE module of the secondary device, and actively broadcasts a BLE message to a surrounding device based on the second connection information delivered in step S305, to declare that the secondary device expects to obtain a specified service, where the BLE message carries the Wi-Fi Aware ID, the Wi-Fi Aware management interface MAC address, and the Wi-Fi Aware security preconfiguration parameter of the secondary device.

S307: The BLE module of the primary device receives a broadcast BLE packet sent by the secondary device in step S306, finds that the Wi-Fi Aware service names of the primary device and the secondary device are the same, and reports the Wi-Fi Aware ID, the Wi-Fi Aware management interface MAC address, and the Wi-Fi Aware security preconfiguration parameter that are carried in the message from the secondary device to the Wi-Fi Aware APK of the primary device. The Wi-Fi Aware APK of the primary device determines, based on a policy of the Wi-Fi Aware APK of the primary device, whether to respond to the received BLE packet. If the Wi-Fi Aware APK of the primary device determines to respond to the received BLE packet, step S308 is performed. If the Wi-Fi Aware APK of the primary device determines not to respond to the received BLE packet, step S303 is performed.

The policy of the Wi-Fi Aware APK of the primary device includes a rejection response to a blocklist and a response to a trustlist. If there is any one of the Wi-Fi Aware ID and the Wi-Fi Aware management interface MAC address that are carried in the message from the secondary device in the blocklist, the primary device determines not to make a response, and step S303 is performed. If there are both the Wi-Fi Aware ID and the Wi-Fi Aware management interface MAC address that are carried in the message from the secondary device in the trustlist, the primary device determines to make a response, and step S308 is performed.

S308: The primary device responds to the secondary device with broadcast by using the BLE Bluetooth module, where the broadcast carries the Wi-Fi Aware ID, the Wi-Fi Aware management interface MAC address, the Wi-Fi Aware security preconfiguration parameter, and the Wi-Fi Aware timestamp of the primary device.

S309: The secondary device receives a packet that is broadcast and responded by the primary device through BLE, and then reports the Wi-Fi Aware ID, the Wi-Fi Aware management interface MAC address, the Wi-Fi Aware security preconfiguration parameter, and the Wi-Fi Aware timestamp of the primary device that are carried in the packet to the Wi-Fi Aware APK of the secondary device.

S310: The Wi-Fi Aware APK of the primary device notifies the Wi-Fi module that in a next active time window, there is a Wi-Fi Aware device whose Wi-Fi Aware service name, Wi-Fi Aware ID, Wi-Fi Aware management interface MAC address, and Wi-Fi Aware security preconfiguration parameter are the same as those carried in the message from the secondary device, to perform Wi-Fi Aware link establishment.

S311: The Wi-Fi Aware APK of the secondary device instructs the Wi-Fi module to calculate a next active time window based on the Wi-Fi Aware timestamp delivered by the primary device, and to perform Wi-Fi Aware data link establishment with a Wi-Fi Aware device with the delivered Wi-Fi Aware management interface MAC address by using the delivered Wi-Fi Aware service name, Wi-Fi Aware ID, and Wi-Fi Aware security preconfiguration parameter.

S312. The Wi-Fi module of the primary device wakes up based on a Wi-Fi Aware clock within the calculated next active time window to perform passive listening.

S313. The Wi-Fi module of the secondary device wakes up in the calculated next active time window based on a Wi-Fi Aware clock, and sends a data path request frame to the primary device based on the preconfigured Wi-Fi Aware parameters in step S311, to perform a data link establishment request.

S314: After receiving the data path request frame from the secondary device, the primary device determines whether a sender of the data path request frame is the Wi-Fi Aware device that performs the Wi-Fi Aware link establishment in step S310. If the sender of the data path request frame is the Wi-Fi Aware device, the primary device responds with a data path response frame. If the sender of the data path request frame is not the Wi-Fi Aware device, step S312 is performed to continue to perform passive listening.

S315: If the secondary device receives the data path response frame responded by the primary device, the secondary device continues to send a data path confirm frame.

S316: If the primary device receives the data path confirm frame sent by the secondary device, and the secondary device is the device matched in step S314, the primary device responds with a data path key installment frame. In this case, the Wi-Fi Aware data link establishment is completed.

In steps S311 to S316, a specific implementation in which the primary device and the secondary device complete the data link establishment by using an application is provided. The preconfigured Wi-Fi Aware parameters are exchanged in a Wi-Fi Aware device discovery process, so that after the secondary device determines that the primary device can provide a needed Wi-Fi Aware service, battery resource consumption in original passive listening is reduced, and processes of service discovery subscribe and service discovery publish are omitted, and a speed of establishing a link between Wi-Fi Aware devices is effectively improved.

In an embodiment, a device with a Wi-Fi Aware function may complete data exchange without Wi-Fi, an AP, or a cellular network.

Figure 7:
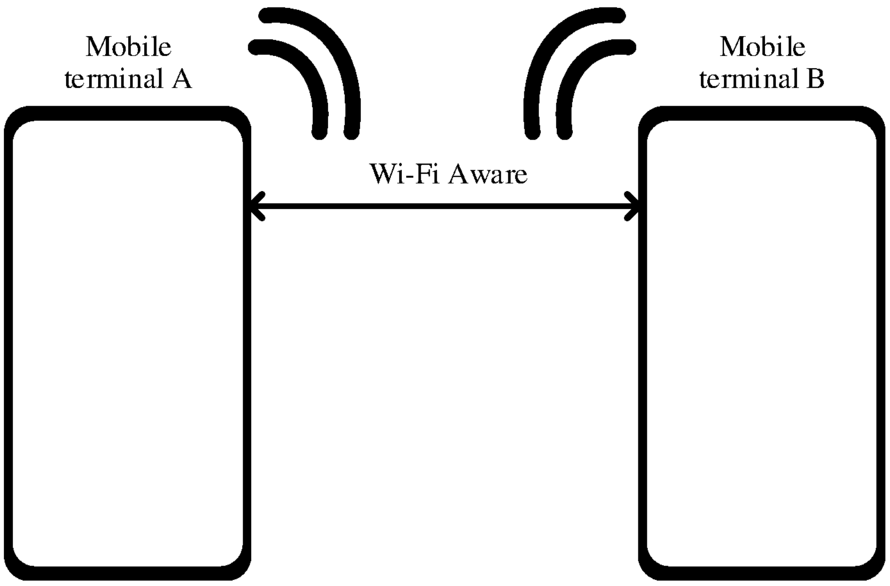
FIG. 7 is a scenario graph of a Wi-Fi Aware link establishment method according to an embodiment of this application.

Specifically, as shown in FIG. 7, a mobile terminal A and a mobile terminal B may communicate with each other within a limited distance by using the Wi-Fi Aware function. Use of the Wi-Fi Aware function includes but is not limited to the following manner.

File sharing: It may be understood that a user may complete Wi-Fi Aware data link establishment with the mobile terminal B by using the mobile terminal A, so that the user can send, by using the mobile terminal A, a document file, an image file, a video file, and the like that the mobile terminal B wants to obtain. Specifically, in a place where there is no Wi-Fi or a Wi-Fi signal is weak, for example, a concert site, a basketball hall, or a concert hall, Wi-Fi Aware may be used to complete link establishment, to implement connection and communication between devices. In addition, duration of establishing a link between the devices is short, and battery resource consumption is low.

Specifically, the following steps are included.

After starting an application related to the file sharing, the mobile terminal A obtains a Wi-Fi Aware parameter from a Wi-Fi module, where the Wi-Fi Aware parameter includes a Wi-Fi Aware management interface MAC address and a Wi-Fi Aware timestamp.

The mobile terminal A delivers preconfigured Wi-Fi Aware parameters as follows to a BLE Bluetooth module: a Wi-Fi Aware service name for file sharing (documents, images, and videos, and the like), a Wi-Fi Aware ID, the Wi-Fi Aware management interface MAC address, a Wi-Fi Aware security preconfiguration parameter, and the Wi-Fi Aware timestamp.

The BLE Bluetooth module of the mobile terminal A passively listens to a surrounding broadcast BLE message based on the delivered preconfigured Wi-Fi Aware parameters, to identify whether there is a matched Wi-Fi Aware device that can be served.

The mobile terminal B obtains a Wi-Fi Aware parameter from a Wi-Fi module, where the Wi-Fi Aware parameter includes a Wi-Fi Aware management interface MAC address.

The mobile terminal B delivers preconfigured Wi-Fi Aware parameters as follows to a BLE Bluetooth module: a service name for file sharing, a Wi-Fi Aware ID, the Wi-Fi Aware management interface MAC address, and a Wi-Fi Aware security preconfiguration parameter.

The mobile terminal B enables the BLE module of the mobile terminal B, and actively broadcasts a BLE message to a surrounding device based on the preconfigured Wi-Fi Aware parameters delivered in last step, to declare that the mobile terminal B expects to obtain a file sharing service, where the BLE message carries the Wi-Fi Aware ID, the Wi-Fi Aware management interface MAC address, and the Wi-Fi Aware security preconfiguration parameter of the mobile terminal B.

The BLE module of the mobile terminal A receives a broadcast BLE packet sent by the mobile terminal B, finds that the service names for file sharing of the two parties are the same, and reports the Wi-Fi Aware ID, the Wi-Fi Aware management interface MAC address, and the Wi-Fi Aware security preconfiguration parameter that are carried in the message from the mobile terminal B to the mobile terminal A. The mobile terminal A determines whether to respond to the received BLE packet based on a policy of the mobile terminal A. If the mobile terminal A determines to respond to the received BLE packet, the following remaining steps continue to be performed. If the mobile terminal A determines not to respond to the received BLE packet, the step of passively listening to a surrounding broadcast BLE message to identify whether there is a matched Wi-Fi Aware device that can be served is performed.

The mobile terminal A responds to the mobile terminal B with broadcast by using the BLE Bluetooth module, where the broadcast carries the Wi-Fi Aware ID, the Wi-Fi Aware management interface MAC address, the Wi-Fi Aware security preconfiguration parameter, and the Wi-Fi Aware timestamp of the mobile terminal A.

The mobile terminal B receives a packet that is broadcast and responded by the mobile terminal A through BLE, and then reports the Wi-Fi Aware ID, the Wi-Fi Aware management interface MAC address, the Wi-Fi Aware security preconfiguration parameter, and the Wi-Fi Aware timestamp of the mobile terminal A carried in the packet to the mobile terminal B.

The mobile terminal A notifies the Wi-Fi module that in a next active time window, there is a Wi-Fi Aware device whose service name for file sharing, Wi-Fi Aware ID, Wi-Fi Aware management interface MAC address, and Wi-Fi Aware security preconfiguration parameter are the same as those carried in the message from the secondary device, to perform Wi-Fi Aware data link establishment.

The mobile terminal B instructs the Wi-Fi module to calculate a next active time window based on the Wi-Fi Aware timestamp delivered by the mobile terminal A, and to perform Wi-Fi Aware data link establishment with a Wi-Fi Aware device with the delivered Wi-Fi Aware management interface MAC address by using the delivered service name for file sharing, Wi-Fi Aware ID, and Wi-Fi Aware security preconfiguration parameter.

The Wi-Fi module of the mobile terminal A wakes up based on a Wi-Fi Aware clock within the calculated next active time window to perform passive listening.

The Wi-Fi module of the mobile terminal B wakes up in the calculated next active time window based on a Wi-Fi Aware clock, and sends a data path request frame to the mobile terminal A, to perform a data link establishment request.

After receiving the data path request frame from the mobile terminal B, the mobile terminal A determines whether a sender of the data path request frame is the mobile terminal B. If the sender of the data path request frame is the mobile terminal B, the mobile terminal A responds with a data path response frame. If the sender of the data path request frame is not the mobile terminal B, the step that the Wi-Fi module of the mobile terminal A wakes up based on a Wi-Fi Aware clock within the calculated next active time window to perform passive listening is performed.

If the mobile terminal B receives the data path response frame responded by the mobile terminal A, the mobile terminal B continues to send a data path confirm frame.

If the mobile terminal A receives the data path confirm frame sent by the mobile terminal B, and the mobile terminal B is confirmed to be successfully matched, the mobile terminal A responds with a data path key installment frame. In this case, the Wi-Fi Aware data link establishment is completed.

Further, the use of the Wi-Fi Aware function further includes a manner of joining a game session. It may be understood that some games need to be connected to the Internet for battle. When there is no network such as Wi-Fi, the Wi-Fi Aware function can be used to implement network connection. Specifically, providing of game session joining is also a service that can be provided, and joining of a game session is a Wi-Fi Aware service that is expected by a device. For example, a mobile terminal A provides a service of joining a game session through Wi-Fi Aware, and if a user of a mobile terminal B wants to play a game together with a user of the mobile terminal A online, the Wi-Fi Aware may be used to indicate a service expected by the mobile terminal B, that is, joining the game session. Specific Wi-Fi Aware link establishment steps are similar to the foregoing Wi-Fi Aware link establishment steps for file sharing, and details are not described herein again. Similarly, in this embodiment, information exchanged in original service discovery subscribe and service discovery publish steps and clock synchronization information may be easily obtained in a service discovery process, so that in a Wi-Fi Aware link establishment process, duration of establishing a link between devices is short, and battery resource consumption is low.

In embodiments of this application, the primary device performs the device discovery interaction with the secondary device, to determine whether the primary device can provide the Wi-Fi Aware service needed by the secondary device. The secondary device performs a next step of link establishment with the primary device only when the primary device can provide the Wi-Fi Aware service needed by the secondary device. In the interaction process of Wi-Fi Aware device discovery, the first connection information and the second connection information are exchanged, so that in a device discovery process, parameters, which are exchanged in the service discovery subscribe frame and the service discovery publish frame in the Wi-Fi Aware protocol in a link establishment step of the conventional technology, of the primary device and the secondary device are obtained. In a case in which the parameters exchanged in the service discovery subscribe frame and the service discovery publish frame in the Wi-Fi Aware protocol are obtained at a Wi-Fi Aware device discovery stage, the primary device and the secondary device can skip the steps of service discovery subscribe and service discovery publish, and complete Wi-Fi Aware link establishment more quickly, to effectively improve the speed of establishing the link between the Wi-Fi Aware devices.

It should be understood that sequence numbers of the steps do not mean execution sequences in the foregoing embodiments. The execution sequences of the processes should be determined based on functions and internal logic of the processes, but should not be construed as any limitation on implementation processes of embodiments of this application.

Based on the Wi-Fi Aware link establishment methods provided in embodiments, embodiments of this application further provide a system for implementing steps and methods in the foregoing method embodiments. The Wi-Fi Aware link establishment system includes a primary device and a secondary device. The primary device is configured to perform the following steps:

The primary device receives first connection information sent by the secondary device, where the first connection information includes a Wi-Fi Aware service name needed by the secondary device, the first connection information further includes a Wi-Fi Aware parameter preconfigured by the secondary device, and the Wi-Fi Aware parameter preconfigured by the secondary device includes parameters exchanged in a service discovery subscribe frame in a Wi-Fi Aware protocol.

The primary device sends second connection information to the secondary device based on the Wi-Fi Aware service name needed by the secondary device, where the second connection information includes confirmation information, the confirmation information is notification information indicating that the primary device confirms that there is the Wi-Fi Aware service name needed by the secondary device, the secondary device confirms, based on the confirmation information, that there is the Wi-Fi Aware service name needed by the secondary device in the primary device, the second connection information further includes a Wi-Fi Aware parameter preconfigured by the primary device, and the Wi-Fi Aware parameter preconfigured by the primary device includes parameters exchanged in a service discovery publish frame in the Wi-Fi Aware protocol.

The primary device obtains a Wi-Fi Aware data path request frame sent by the secondary device.

The primary device completes link establishment with the secondary device based on the Wi-Fi Aware data path request frame.

Further, That the primary device receives first connection information sent by the secondary device includes:

- the primary device receives, based on a broadcast function of a BLE Bluetooth module, the first connection information sent by the secondary device.

Further, the second connection information further includes a Wi-Fi Aware timestamp of the primary device. The Wi-Fi Aware timestamp of the primary device is used to synchronize a clock of the secondary device.

Further, this method further includes:

- the primary device adjusts a timestamp of the clock of the secondary device to be consistent with the Wi-Fi Aware timestamp of the primary device based on the Wi-Fi Aware timestamp sent to the secondary device.

Further, the parameters exchanged in the service discovery subscribe frame in the Wi-Fi Aware protocol include a Wi-Fi Aware management interface MAC address of the secondary device, a Wi-Fi Aware identifier of the secondary device, and data encryption preconfiguration information of the secondary device. The parameters exchanged in the service discovery publish frame in the Wi-Fi Aware protocol include a Wi-Fi Aware management interface MAC address of the primary device, a Wi-Fi Aware identifier of the primary device, and data encryption preconfiguration information of the primary device.

Further, that the primary device completes link establishment with the secondary device based on the Wi-Fi Aware data path request frame includes:

- the primary device determines, based on the Wi-Fi Aware parameter preconfigured by the secondary device, whether the Wi-Fi Aware data path request frame is from the secondary device, and sends a Wi-Fi Aware data path response frame to the secondary device in a next active time window if the Wi-Fi Aware data path request frame is from the secondary device; and
- the primary device completes link establishment with the secondary device after the secondary device receives the Wi-Fi Aware data path response frame.

Further, that the primary device completes link establishment with the secondary device based on the Wi-Fi Aware data path request frame includes:

- the primary device determines, based on the Wi-Fi Aware parameter preconfigured by the secondary device, whether the Wi-Fi Aware data path request frame is from the secondary device, and sends a Wi-Fi Aware data path response frame to the secondary device in a next active time window if the Wi-Fi Aware data path request frame is from the secondary device;
- the primary device determines whether the Wi-Fi Aware parameter preconfigured by the secondary device includes the data encryption preconfiguration information of the secondary device; and if the Wi-Fi Aware parameter preconfigured by the secondary device includes the data encryption preconfiguration information of the secondary device, the primary device obtains a Wi-Fi Aware data path confirm frame sent by the secondary device;
- the primary device determines, based on the Wi-Fi Aware parameter preconfigured by the secondary device, whether the Wi-Fi Aware data path confirm frame is from the secondary device, and sends a Wi-Fi Aware data path key installment frame to the secondary device if the Wi-Fi Aware data path confirm frame is from the secondary device; and
- the primary device completes link establishment with the secondary device after the secondary device receives the Wi-Fi Aware data path key installment frame.

The secondary device is configured to perform the following steps.

The secondary device sends first connection information to the primary device, where the first connection information includes a Wi-Fi Aware service name needed by the secondary device, the first connection information further includes a Wi-Fi Aware parameter preconfigured by the secondary device, and the Wi-Fi Aware parameter preconfigured by the secondary device includes parameters exchanged in a service discovery subscribe frame in a Wi-Fi Aware protocol.

The secondary device receives second connection information sent by the primary device, where the second connection information includes confirmation information, the confirmation information is notification information indicating that the primary device confirms that there is the Wi-Fi Aware service name needed by the secondary device, the second connection information further includes a Wi-Fi Aware parameter preconfigured by the primary device, and the Wi-Fi Aware parameter preconfigured by the primary device includes parameters exchanged in a service discovery publish frame in the Wi-Fi Aware protocol.

The secondary device confirms, based on the confirmation information, that there is the Wi-Fi Aware service name needed by the secondary device in the primary device.

The secondary device sends a Wi-Fi Aware data path request frame to the primary device, and completes link establishment with the primary device based on the Wi-Fi Aware data path request frame.

Further, that the secondary device sends first connection information to the primary device includes:

the secondary device sends the first connection information to the primary device based on a broadcast function of a BLE Bluetooth module.

Further, the second connection information further includes a Wi-Fi Aware timestamp of the primary device. The Wi-Fi Aware timestamp of the primary device is used to synchronize a clock of the secondary device.

Further, this method further includes:

the secondary device adjusts a timestamp of the clock to be consistent with the Wi-Fi Aware timestamp of the primary device based on the received Wi-Fi Aware timestamp of the primary device.

Further, the parameters exchanged in the service discovery subscribe frame in the Wi-Fi Aware protocol include a Wi-Fi Aware management interface MAC address of the secondary device, a Wi-Fi Aware identifier of the secondary device, and data encryption preconfiguration information of the secondary device. The parameters exchanged in the service discovery publish frame in the Wi-Fi Aware protocol include a Wi-Fi Aware management interface MAC address of the primary device, a Wi-Fi Aware identifier of the primary device, and data encryption preconfiguration information of the primary device.

Further, that the secondary device completes link establishment with the primary device based on the Wi-Fi Aware data path request frame includes:

the secondary device sends the Wi-Fi Aware data path request frame to the primary device; and after the primary device determines, based on the Wi-Fi Aware parameter preconfigured by the secondary device, that the Wi-Fi Aware data path request frame is from the secondary device, the secondary device receives, in a next active time window, a Wi-Fi Aware data path response frame sent by the primary device, and completes link establishment with the primary device.

Further, that the secondary device completes link establishment with the primary device based on the Wi-Fi Aware data path request frame includes:

the secondary device sends the Wi-Fi Aware data path request frame to the primary device;

the secondary device receives, in the next active time window, the Wi-Fi Aware data path response frame sent by the primary device after the primary device determines, based on the Wi-Fi Aware parameter preconfigured by the secondary device, that the Wi-Fi Aware data path request frame is from the secondary device;

the secondary device determines whether the Wi-Fi Aware parameter preconfigured by the primary device includes the data encryption preconfiguration information; and if the Wi-Fi Aware parameter preconfigured by the primary device includes the data encryption preconfiguration information, the secondary device sends a Wi-Fi Aware data path confirm frame to the primary device after the secondary device receives the Wi-Fi Aware data path response frame sent by the primary device; and after the primary device determines, based on the Wi-Fi Aware parameter preconfigured by the secondary device, that the Wi-Fi Aware data path confirm frame is from the secondary device, the secondary device receives a Wi-Fi Aware data path key installment frame sent by the primary device, and completes link establishment with the primary device.

It may be understood that, in the conventional technology, the parameters exchanged in the service discovery subscribe frame in the Wi-Fi Aware protocol and the parameters exchanged in the service discovery publish frame in the Wi-Fi Aware protocol need to be obtained by using steps of interaction of service discovery subscribe and service discovery publish in the Wi-Fi Aware protocol. However, in embodiments of this application, the parameters exchanged in the service discovery subscribe frame in the Wi-Fi Aware protocol and the parameters exchanged in the service discovery publish frame in the Wi-Fi Aware protocol are exchanged in a Wi-Fi Aware device discovery process, so that the primary device and the secondary device can skip the steps of interaction of service discovery subscribe and service discovery publish, and directly establish a data link based on the first connection information and the second connection information, to effectively improve a speed of establishing the link.

In embodiments of this application, the primary device performs the device discovery interaction with the secondary device, to determine whether the primary device can provide the Wi-Fi Aware service needed by the secondary device. The secondary device performs a next step of link establishment with the primary device only when the primary device can provide the Wi-Fi Aware service needed by the secondary device. In the interaction process of Wi-Fi Aware device discovery, the first connection information and the second connection information are exchanged, so that in a device discovery process, parameters, which are exchanged in the service discovery subscribe frame and the service discovery publish frame in the Wi-Fi Aware protocol in a link establishment step of the conventional technology, of the primary device and the secondary device are obtained. In a case in which the parameters exchanged in the service discovery subscribe frame and the service discovery publish frame in the Wi-Fi Aware protocol are obtained at a Wi-Fi Aware device discovery stage, the primary device and the secondary device can skip the steps of service discovery subscribe and service discovery publish, and complete Wi-Fi Aware link establishment more quickly, to effectively improve the speed of establishing the link between the Wi-Fi Aware devices.

Embodiments provide a computer-readable storage medium. The computer-readable storage medium stores computer-readable instructions. When the computer-readable instructions are executed by a processor, the method for link establishment in the embodiments is implemented. To avoid repetition, details are not described herein again. Alternatively, when the computer-readable instructions are executed by a processor, functions of the modules/units in an apparatus for link establishment in the embodiments are implemented. To avoid repetition, details are not described herein again.

It should be clear that the described embodiments are merely some rather than all of embodiments of this application. All other embodiments obtained by a person of ordinary skill in the art based on embodiments of this application without creative efforts shall fall within the protection scope of this application.

It may be clearly understood by a person skilled in the art that, for ease and brevity of description, division of the foregoing functional units and modules is merely used as an example for description. In actual application, the foregoing functions may be allocated to different functional units and modules for implementation according to requirements, that is, an internal structure of an apparatus is divided into different functional units or modules to implement all or some of the foregoing described functions.

The foregoing embodiments are merely used to describe the technical solutions of this application, but are not intended to limit this application. Although this application is described in detail with reference to the foregoing embodiments, a person of ordinary skill in the art should understand that the technical solutions stored in the foregoing embodiments may still be modified, or some technical features thereof may be equivalently replaced. These modifications or replacements do not enable a corresponding technical solution to depart from the spirit and scope of the technical solutions of embodiments of this application, and shall fall within the protection scope of this application.

What is claimed is:

1. A method, comprising:

receiving, by a primary device based on a broadcast function of a Bluetooth (BLE) transmitter of a secondary device, first connection information sent by the secondary device, wherein the first connection information comprises a wireless fidelity (Wi-Fi) Aware service name required by the secondary device, the first connection information further comprises a Wi-Fi Aware parameter preconfigured by the secondary device, and the Wi-Fi Aware parameter preconfigured by the secondary device comprises parameters exchanged in a service discovery subscribe frame in a Wi-Fi Aware protocol;

sending, by the primary device based on a broadcast function of a BLE transmitter of the primary device, second connection information to the secondary device based on the Wi-Fi Aware service name required by the secondary device, wherein the second connection information comprises confirmation information, the confirmation information comprises notification information indicating that the primary device confirms that the Wi-Fi Aware service name is required by the secondary device, wherein the secondary device confirms, based on the confirmation information, that the Wi-Fi Aware service name is required by the secondary device in the primary device, wherein the second connection information further comprises a Wi-Fi Aware parameter preconfigured by the primary device, the Wi-Fi Aware parameter preconfigured by the primary device comprises parameters exchanged in a service discovery publish frame in the Wi-Fi Aware protocol, and the second connection information further comprises a Wi-Fi Aware timestamp of the primary device that is useable to synchronize a clock of the secondary device;

obtaining, by the primary device, a Wi-Fi Aware data path request frame for a Wi-Fi Aware data path sent by the secondary device; and after the obtaining the Wi-Fi Aware data path request frame, completing, by the primary device, link establishment for the Wi-Fi Aware data path with the secondary device based on the Wi-Fi Aware data path request frame, wherein the first connection information is received via a BLE broadcast message outside any discovery window, and wherein the completing the link establishment for the Wi-Fi Aware data path bypasses exchanging any service discovery subscribe frame and any service discovery publish frame between the primary device and the secondary device, and wherein the parameters exchanged in the service discovery subscribe frame in the Wi-Fi Aware protocol via the BLE broadcast message comprise a Wi-Fi Aware management interface media access control (MAC) address of the secondary device, a Wi-Fi Aware identifier of the secondary device, and data encryption pre-configuration information of the secondary device.

2. The method according to claim 1, further comprising:

adjusting, by the primary device, a timestamp of the clock of the secondary device to be consistent with the Wi-Fi Aware timestamp of the primary device based on the Wi-Fi Aware timestamp of the primary device that is sent to the secondary device.

3. The method according to claim 1, wherein the parameters exchanged in the service discovery publish frame in the Wi-Fi Aware protocol via a second BLE broadcast message comprise a Wi-Fi Aware management interface MAC address of the primary device, a Wi-Fi Aware identifier of the primary device, and data encryption pre-configuration information of the primary device.

4. The method according to claim 1, wherein the completing, by the primary device, the link establishment with the secondary device based on the Wi-Fi Aware data path request frame comprises:

determining, by the primary device based on the Wi-Fi Aware parameter preconfigured by the secondary device, whether the Wi-Fi Aware data path request frame is from the secondary device, and sending a Wi-Fi Aware data path response frame to the secondary device in a next active time window when it is determined that the Wi-Fi Aware data path request frame is from the secondary device; and completing, by the primary device, the link establishment with the secondary device after the secondary device receives the Wi-Fi Aware data path response frame.

5. The method according to claim 1, wherein the completing, by the primary device, the link establishment with the secondary device based on the Wi-Fi Aware data path request frame comprises:

determining, by the primary device based on the Wi-Fi Aware parameter preconfigured by the secondary device, whether the Wi-Fi Aware data path request frame is from the secondary device, and sending a Wi-Fi Aware data path response frame to the secondary device in a next active time window when it is determined that the Wi-Fi Aware data path request frame is from the secondary device;

determining, by the primary device, whether the Wi-Fi Aware parameter preconfigured by the secondary device comprises the data encryption pre-configuration information of the secondary device, and when it is determined that the Wi-Fi Aware parameter preconfigured by the secondary device comprises the data encryption pre-configuration information of the secondary device, obtaining, by the primary device, a Wi-Fi Aware data path confirm frame sent by the secondary device;

determining, by the primary device based on the Wi-Fi Aware parameter preconfigured by the secondary device, whether the Wi-Fi Aware data path confirm frame is from the secondary device, and sending, by the primary device, a Wi-Fi Aware data path key installment frame to the secondary device when it is determined that the Wi-Fi Aware data path confirm frame is from the secondary device; and completing, by the primary device, the link establishment with the secondary device after the secondary device receives the Wi-Fi Aware data path key installment frame.

6. A method, comprising:

sending, by a secondary device based on a broadcast function of a Bluetooth (BLE) transmitter of the secondary device, first connection information to a primary device, wherein the first connection information comprises a wireless fidelity (Wi-Fi) Aware service name required by the secondary device, the first connection information further comprises a Wi-Fi Aware parameter preconfigured by the secondary device, and the Wi-Fi Aware parameter preconfigured by the secondary device comprises parameters exchanged in a service discovery subscribe frame in a Wi-Fi Aware protocol;

receiving, by the secondary device based on a broadcast function of a BLE transmitter of the primary device, second connection information sent by the primary device, wherein the second connection information comprises confirmation information, the confirmation information comprises notification information indicating that the primary device confirms that the Wi-Fi Aware service name is required by the secondary device, the second connection information further comprises a Wi-Fi Aware parameter preconfigured by the primary device, the Wi-Fi Aware parameter preconfigured by the primary device comprises parameters exchanged in a service discovery publish frame in the Wi-Fi Aware protocol, and the second connection information further comprises a Wi-Fi Aware timestamp of the primary device;

confirming, by the secondary device based on the confirmation information, that the Wi-Fi Aware service name is required by the secondary device in the primary device;

sending, by the secondary device, a Wi-Fi Aware data path request frame for a Wi-Fi Aware data path to the primary device; and after the sending the Wi-Fi Aware data path request frame, completing link establishment for the Wi-Fi Aware data path with the primary device based on the Wi-Fi Aware data path request frame, wherein the first connection information is received via a BLE broadcast message outside any discovery window, and wherein the completing the link establishment for the Wi-Fi Aware data path bypasses exchanging any service discovery subscribe frame and any service discovery publish frame between the primary device and the secondary device, and wherein the parameters exchanged in the service discovery subscribe frame in the Wi-Fi Aware protocol via the BLE broadcast message comprise a Wi-Fi Aware management interface media access control (MAC) address of the secondary device, a Wi-Fi Aware identifier of the secondary device, and data encryption pre-configuration information of the secondary device.

7. The method according to claim 6, further comprising:

adjusting, by the secondary device, a timestamp of a clock to be consistent with the Wi-Fi Aware timestamp of the primary device based on the Wi-Fi Aware timestamp of the primary device.

8. The method according to claim 6, wherein the parameters exchanged in the service discovery publish frame in the Wi-Fi Aware protocol via a second BLE broadcast message comprise a Wi-Fi Aware management interface MAC address of the primary device, a Wi-Fi Aware identifier of the primary device, and data encryption pre-configuration information of the primary device.

9. The method according to claim 6, wherein completing the link establishment with the primary device based on the Wi-Fi Aware data path request frame comprises:

after the primary device determines, based on the Wi-Fi Aware parameter preconfigured by the secondary device, that the Wi-Fi Aware data path request frame is from the secondary device, receiving, by the secondary device in a next active time window, a Wi-Fi Aware data path response frame sent by the primary device, and completing the link establishment with the primary device.

10. The method according to claim 8, wherein the completing the link establishment with the primary device based on the Wi-Fi Aware data path request frame comprises:

receiving, by the secondary device in a next active time window, a Wi-Fi Aware data path response frame sent by the primary device after the primary device determines, based on the Wi-Fi Aware parameter preconfigured by the secondary device, that the Wi-Fi Aware data path request frame is from the secondary device;

determining, by the secondary device, whether the Wi-Fi Aware parameter preconfigured by the primary device comprises the data encryption pre-configuration information of the primary device, and when it is determined that the Wi-Fi Aware parameter preconfigured by the primary device comprises the data encryption pre-configuration information of the primary device, sending a Wi-Fi Aware data path confirm frame to the primary device after the secondary device receives the Wi-Fi Aware data path response frame sent by the primary device; and after the primary device determines, based on the Wi-Fi Aware parameter preconfigured by the secondary device, that the Wi-Fi Aware data path confirm frame is from the secondary device, receiving, by the secondary device, a Wi-Fi Aware data path key installment frame sent by the primary device, and completing the link establishment with the primary device.

11. A primary device, comprising:

at least one processor; and at least one memory, the at least one memory comprising instructions that, when executed by the at least one processor, cause the primary device to:

receive first connection information sent by a secondary device based on a broadcast function of a Bluetooth (BLE) transmitter of the secondary device, wherein the first connection information comprises a wireless fidelity (Wi-Fi) Aware service name required by the secondary device, the first connection information further comprises a Wi-Fi Aware parameter preconfigured by the secondary device, and the Wi-Fi Aware parameter preconfigured by the secondary device comprises parameters exchanged in a service discovery subscribe frame in a Wi-Fi Aware protocol;

based on a broadcast function of a BLE transmitter of the primary device, send second connection information to the secondary device based on the Wi-Fi Aware service name needed by the secondary device, wherein the second connection information comprises confirmation information, the confirmation information comprises notification information indicating that the primary device confirms that the Wi-Fi Aware service name is needed by the secondary device, and wherein the secondary device confirms, based on the confirmation information, that the Wi-Fi Aware service name is needed by the secondary device in the primary device, the second connection information further comprises a Wi-Fi Aware parameter preconfigured by the primary device, the Wi-Fi Aware parameter preconfigured by the primary device comprises parameters exchanged in a service discovery publish frame in the Wi-Fi Aware protocol, and the second connection information further comprises a Wi-Fi Aware timestamp of the primary device that is useable to synchronize a clock of the secondary device;

obtain a Wi-Fi Aware data path request frame sent by the secondary device for a Wi-Fi Aware data path; and after obtaining the Wi-Fi Aware data path request frame, complete link establishment for the Wi-Fi Aware data path with the secondary device based on the Wi-Fi Aware data path request frame, wherein the first connection information is received via a BLE broadcast message outside any discovery window, and wherein completing the link establishment for the Wi-Fi Aware data path bypasses exchanging any service discovery subscribe frame and any service discovery publish frame between the primary device and the secondary device, and wherein the parameters exchanged in the service discovery subscribe frame in the Wi-Fi Aware protocol via the BLE broadcast message comprise a Wi-Fi Aware management interface media access control (MAC) address of the secondary device, a Wi-Fi Aware identifier of the secondary device, and data encryption pre-configuration information of the secondary device.

12. The primary device according to claim 11, wherein:

the instructions, when executed by the at least one processor, further cause the primary device to:

adjust a timestamp of the clock of the secondary device to be consistent with the Wi-Fi Aware timestamp of the primary device based on the Wi-Fi Aware timestamp sent to the secondary device.

13. The primary device according to claim 11, wherein the parameters exchanged in the service discovery publish frame in the Wi-Fi Aware protocol via a second BLE broadcast message comprise a Wi-Fi Aware management interface MAC address of the primary device, a Wi-Fi Aware identifier of the primary device, and data encryption pre-configuration information of the primary device;

wherein completing the link establishment with the secondary device based on the Wi-Fi Aware data path request frame comprises:

determining, based on the Wi-Fi Aware parameter preconfigured by the secondary device, whether the Wi-Fi Aware data path request frame is from the secondary device, and sending a Wi-Fi Aware data path response frame to the secondary device in a next active time window when it is determined that the Wi-Fi Aware data path request frame is from the secondary device; and completing the link establishment with the secondary device after the secondary device receives the Wi-Fi Aware data path response frame.

14. The primary device according to claim 11, wherein completing the link establishment with the secondary device based on the Wi-Fi Aware data path request frame comprises:

determining, based on the Wi-Fi Aware parameter preconfigured by the secondary device, whether the Wi-Fi Aware data path request frame is from the secondary device, and send a Wi-Fi Aware data path response frame to the secondary device in a next active time window when it is determined that the Wi-Fi Aware data path request frame is from the secondary device;

determining whether the Wi-Fi Aware parameter preconfigured by the secondary device comprises the data encryption pre-configuration information of the secondary device, and when it is determined that the Wi-Fi Aware parameter preconfigured by the secondary device comprises the data encryption pre-configuration information of the secondary device, obtaining a Wi-Fi Aware data path confirm frame sent by the secondary device;

determining, based on the Wi-Fi Aware parameter preconfigured by the secondary device, whether the Wi-Fi Aware data path confirm frame is from the secondary device, and sending a Wi-Fi Aware data path key installment frame to the secondary device when it is determined that the Wi-Fi Aware data path confirm frame is from the secondary device; and completing the link establishment with the secondary device after the secondary device receives the Wi-Fi Aware data path key installment frame.

15. A secondary device, comprising:

at least one processor; and at least one memory, the at least one memory comprising instructions that when executed by the at least one processor, cause the secondary device to:

send first connection information to a primary device based on a broadcast function of a Bluetooth (BLE) transmitter of the secondary device, wherein the first connection information comprises a wireless fidelity (Wi-Fi) Aware service name required by the secondary device, the first connection information further comprises a Wi-Fi Aware parameter preconfigured by the secondary device, and the Wi-Fi Aware parameter preconfigured by the secondary device comprises parameters exchanged in a service discovery subscribe frame in a Wi-Fi Aware protocol;

based on a broadcast function of a BLE transmitter of the primary device, receive second connection information sent by the primary device, wherein the second connection information comprises confirmation information, the confirmation information comprises notification information indicating that the primary device confirms that the Wi-Fi Aware service name is required by the secondary device, the second connection information further comprises a Wi-Fi Aware parameter preconfigured by the primary device, the Wi-Fi Aware parameter preconfigured by the primary device comprises parameters exchanged in a service discovery publish frame in the Wi-Fi Aware protocol, and the second connection information further comprises a Wi-Fi Aware timestamp of the primary device;

confirm, based on the confirmation information, that the Wi-Fi Aware service name is required by the secondary device in the primary device;

send a Wi-Fi Aware data path request frame for a Wi-Fi Aware data path to the primary device; and after sending the Wi-Fi Aware data path request frame, complete link establishment for the Wi-Fi Aware data path with the primary device based on the Wi-Fi Aware data path request frame, wherein the first connection information is received via a BLE broadcast message outside any discovery window, and wherein completing the link establishment for the Wi-Fi Aware data path bypasses exchanging any service discovery subscribe frame and any service discovery publish frame between the primary device and the secondary device, and wherein the parameters exchanged in the service discovery subscribe frame in the Wi-Fi Aware protocol via the BLE broadcast message comprise a Wi-Fi Aware management interface media access control (MAC) address of the secondary device, a Wi-Fi Aware identifier of the secondary device, and data encryption pre-configuration information of the secondary device.

16. The secondary device according to claim 15, wherein:

the instructions, when executed by the at least one processor, further cause the secondary device to:

adjust a timestamp of a clock to be consistent with the Wi-Fi Aware timestamp of the primary device based on the Wi-Fi Aware timestamp of the primary device.

17. The secondary device according to claim 15, wherein the parameters exchanged in the service discovery publish frame in the Wi-Fi Aware protocol via a second BLE broadcast message comprise a Wi-Fi Aware management interface MAC address of the primary device, a Wi-Fi Aware identifier of the primary device, and data encryption pre-configuration information of the primary device.

18. The secondary device according to claim 15, wherein completing the link establishment with the primary device based on the Wi-Fi Aware data path request frame comprises:

after the primary device determines, based on the Wi-Fi Aware parameter preconfigured by the secondary device, that the Wi-Fi Aware data path request frame is from the secondary device, receiving, in a next active time window, a Wi-Fi Aware data path response frame sent by the primary device, and completing the link establishment with the primary device; or receiving, in a next active time window, a Wi-Fi Aware data path response frame sent by the primary device after the primary device determines, based on the Wi-Fi Aware parameter preconfigured by the secondary device, that the Wi-Fi Aware data path request frame is from the secondary device, determining whether the Wi-Fi Aware parameter preconfigured by the primary device comprises data encryption pre-configuration information of the primary device, and when it is determined that the Wi-Fi Aware parameter preconfigured by the primary device comprises the data encryption pre-configuration information of the primary device, sending a Wi-Fi Aware data path confirm frame to the primary device after the secondary device receives the Wi-Fi Aware data path response frame sent by the primary device, and after the primary device determines, based on the Wi-Fi Aware parameter preconfigured by the secondary device, that the Wi-Fi Aware data path confirm frame is from the secondary device, receiving a Wi-Fi Aware data path key installment frame sent by the primary device, and completing the link establishment with the primary device.

* * * * *